(12) United States Patent
Akiyoshi

(10) Patent No.: US 9,753,545 B2
(45) Date of Patent: Sep. 5, 2017

(54) INPUT DEVICE, INPUT METHOD, AND STORAGE MEDIUM

(71) Applicant: NEC Solution Innovators, Ltd., Tokyo (JP)

(72) Inventor: Kenji Akiyoshi, Tokyo (JP)

(73) Assignee: NEC Solutions Innovators, Ltd., Tokyo (JP)

( * ) Notice: Subject to any disclaimer, the term of this patent is extended or adjusted under 35 U.S.C. 154(b) by 0 days.

(21) Appl. No.: 14/422,124

(22) PCT Filed: Aug. 13, 2013

(86) PCT No.: PCT/JP2013/071893
§ 371 (c)(1),
(2) Date: Feb. 17, 2015

(87) PCT Pub. No.: WO2014/027666
PCT Pub. Date: Feb. 20, 2014

(65) Prior Publication Data
US 2015/0234469 A1    Aug. 20, 2015

(30) Foreign Application Priority Data

Aug. 17, 2012  (JP) ................................ 2012-181223

(51) Int. Cl.
G06F 3/01    (2006.01)
(52) U.S. Cl.
CPC .............. G06F 3/017 (2013.01); G06F 3/011 (2013.01)
(58) Field of Classification Search
CPC .................. G06F 3/017; G06F 3/011

USPC ........................................................ 345/156
See application file for complete search history.

(56) References Cited

U.S. PATENT DOCUMENTS

| 2009/0160803 A1 | 6/2009 | Hashimoto |
| 2009/0217211 A1 | 8/2009 | Hildreth et al. |
| 2009/0228841 A1* | 9/2009 | Hildreth ................ G06F 3/0304 715/863 |

(Continued)

FOREIGN PATENT DOCUMENTS

| CN | 102236414 A * | 11/2011 |
| CN | 102236414 A | 11/2011 |

(Continued)

OTHER PUBLICATIONS

Taiwan Office Action issued in corresponding Taiwan Application No. 102129418, dated Oct. 8, 2015, 17 pages.

(Continued)

*Primary Examiner* — Amare Mengistu
*Assistant Examiner* — Jennifer Zubajlo
(74) *Attorney, Agent, or Firm* — Wilmer Cutler Pickering Hale and Dorr LLP

(57) ABSTRACT

An input device is a device determining an input by a user based on a motion of a hand of the user in picked-up images associated with an operation screen displaying a selectable area. The input device includes an input determiner (155) determining whether or not the input by the user is a select operation of a selectable area or is a gesture operation based on, in the picked-up images, a change in shape of the hand of the user caused by the moving hand. The determined input is transmitted to an application subjected to an operation through a transmitter (156).

6 Claims, 22 Drawing Sheets

(56) References Cited

U.S. PATENT DOCUMENTS

| | | | |
|---|---|---|---|
| 2011/0026765 A1* | 2/2011 | Ivanich | H04N 5/4403 382/103 |
| 2011/0221974 A1* | 9/2011 | Stern | G06F 3/017 348/734 |
| 2011/0239118 A1 | 9/2011 | Yamaoka et al. | |
| 2011/0289455 A1 | 11/2011 | Reville et al. | |
| 2011/0316767 A1* | 12/2011 | Avrahami | G06F 1/1626 345/156 |
| 2013/0057469 A1* | 3/2013 | Ajika | G06F 3/017 345/156 |
| 2013/0300698 A1 | 11/2013 | Hashimoto | |
| 2014/0040835 A1 | 2/2014 | Hildreth et al. | |
| 2016/0077594 A1 | 3/2016 | Hildreth et al. | |

FOREIGN PATENT DOCUMENTS

| | | |
|---|---|---|
| JP | 2009-151691 | 7/2009 |
| JP | 2011-175623 | 9/2011 |
| JP | 2011-204019 | 10/2011 |
| JP | WO 2011142317 A1 * | 11/2011 ............ G06F 3/017 |
| JP | 2011-248606 | 12/2011 |
| TW | 201214199 A | 4/2012 |
| WO | WO-2011/142317 A1 | 11/2011 |

OTHER PUBLICATIONS

International Search Report corresponding to PCT/JP2013/071893, mail date Nov. 19, 2013, 1 page.

Canadian Office Action issued by the Canadian Intellectual Property Office for Application No. 2,882,004 dated Apr. 18, 2016 (6 pages).

Extended European Search Report issued by the European Patent Office for Application No. 13879402.9 dated Mar. 30, 2016 (9 pages).

Chinese Office Action issued by the Patent Office of the People's Republic of China for Application No. 2013800439968 dated Jun. 27, 2016 (21 pages).

Feng, Z., et al., "Hand tracking method based on interactive behavioral analysis," Computer Integrated Manufacturing Systems, vol. 18, No. 1, pp. 31-39 (Jan. 2012).

* cited by examiner

[FIG.1]
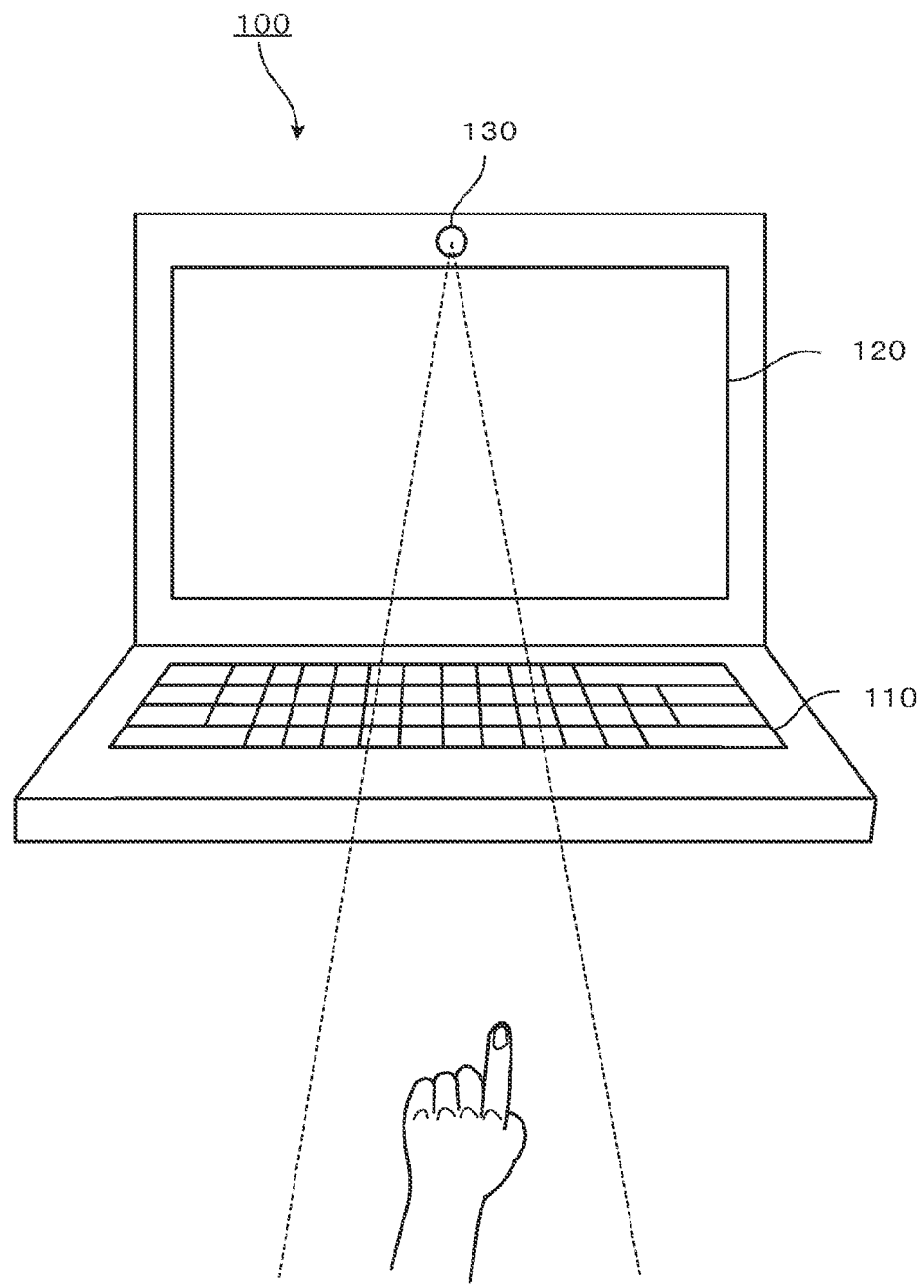

[FIG.2A]
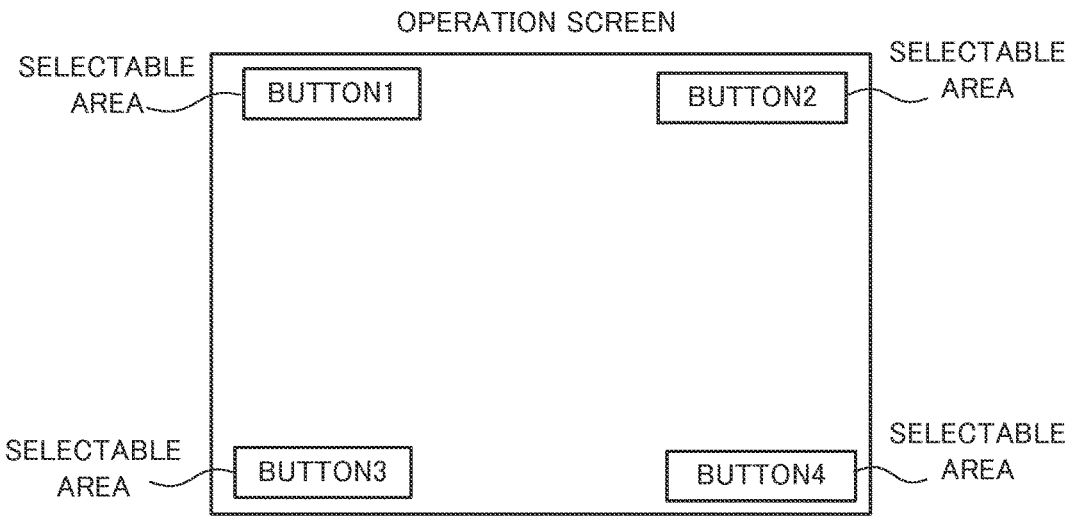
[FIG.2B]
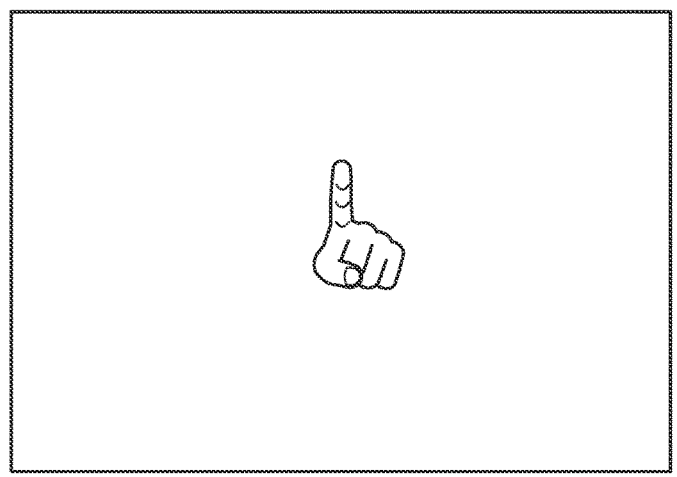
[FIG.2C]
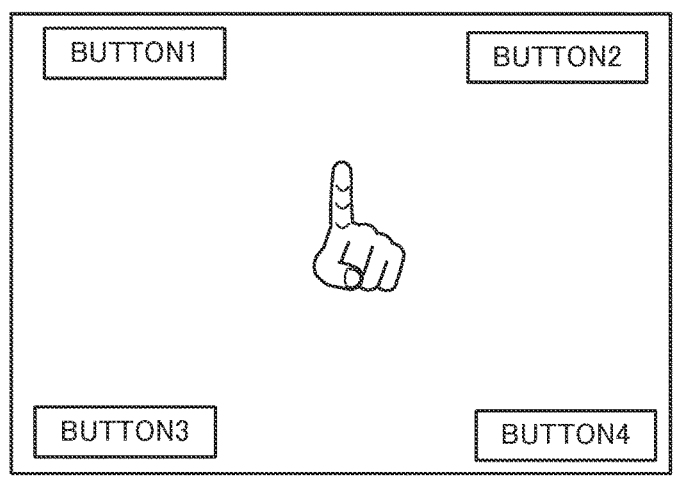

[FIG.3A]
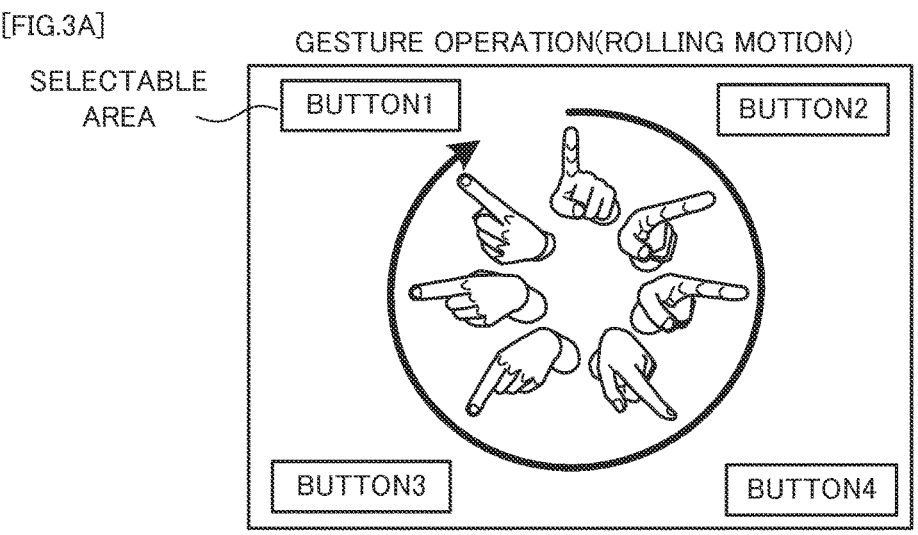
[FIG.3B]
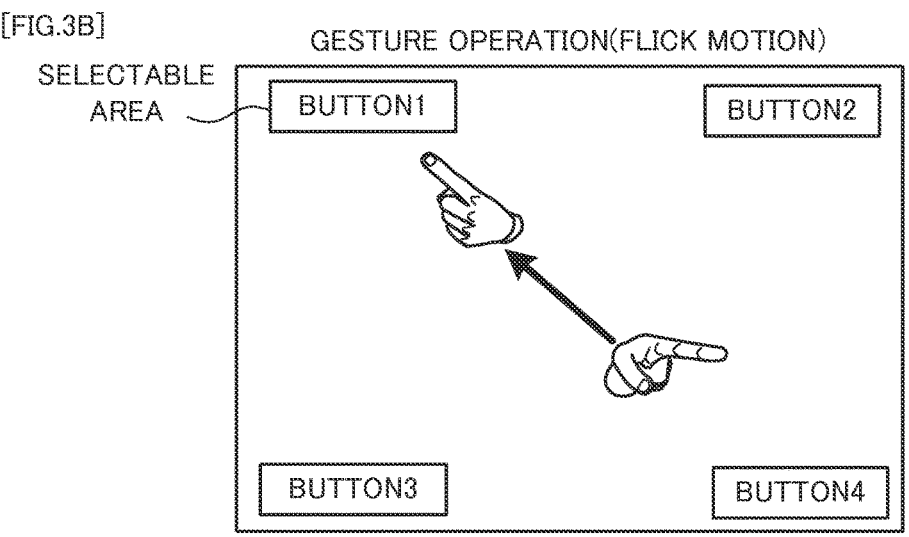
[FIG.3C]
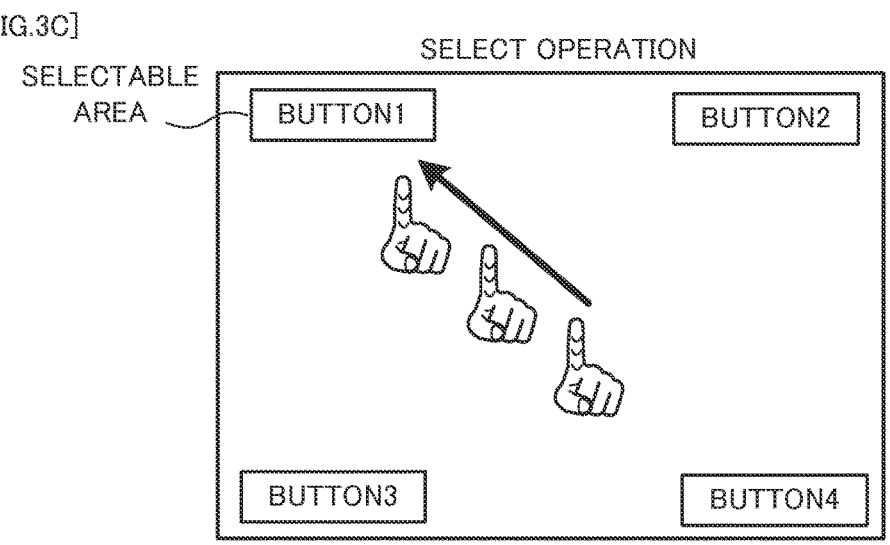

[FIG.4]
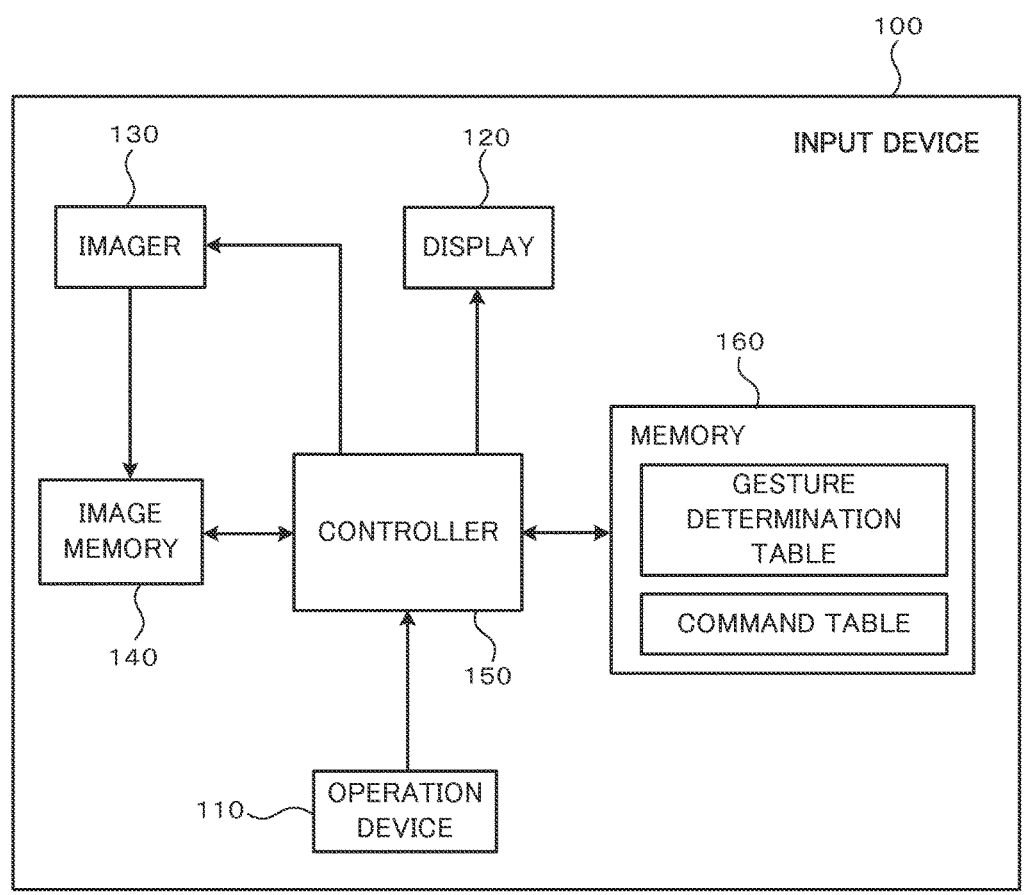

[FIG.5]
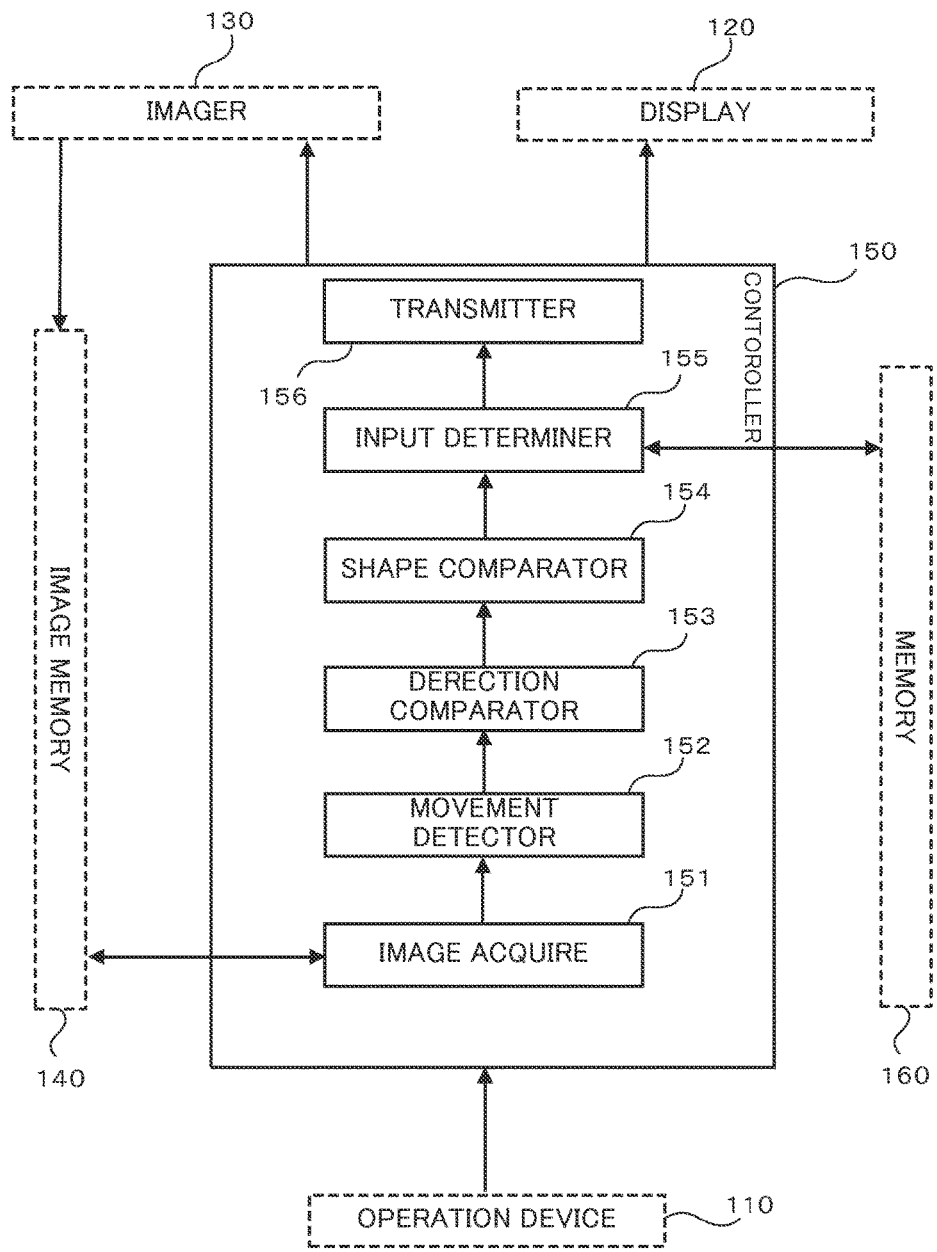

[FIG.6]
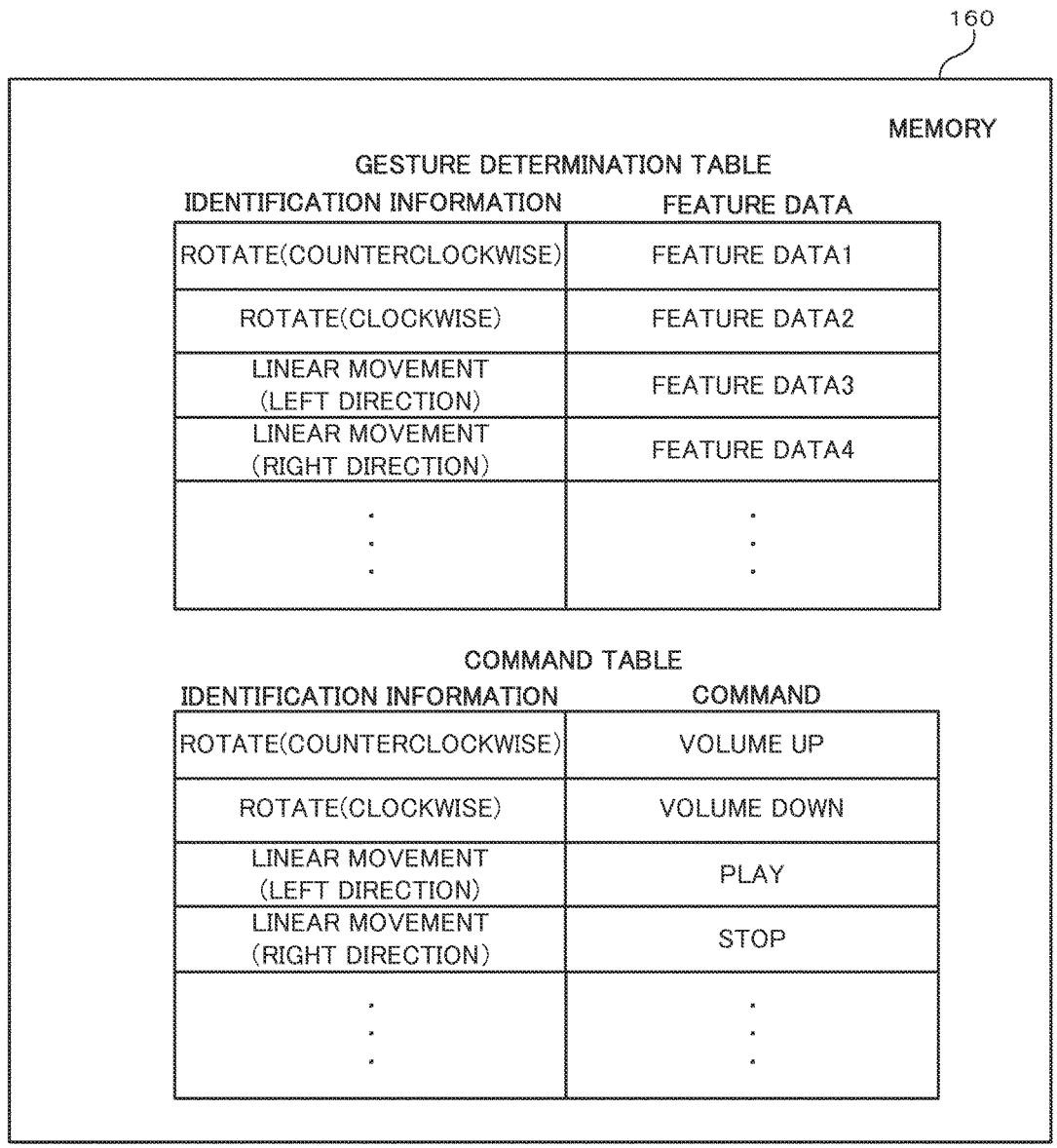

[FIG.7A]
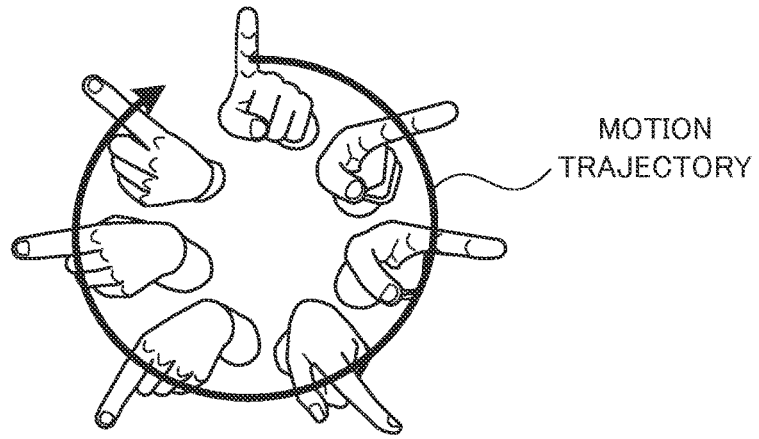
[FIG.7B]
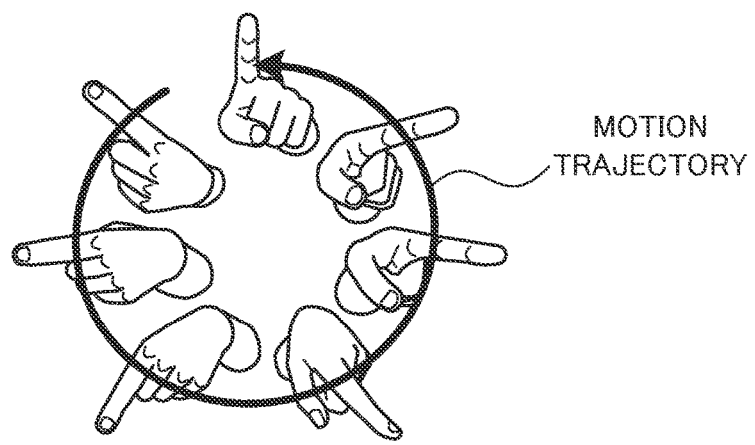
[FIG.7C]
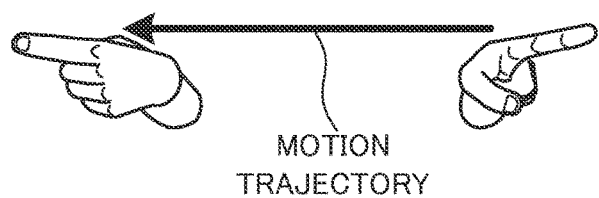
[FIG.7D]
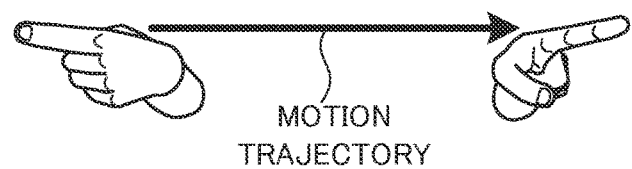

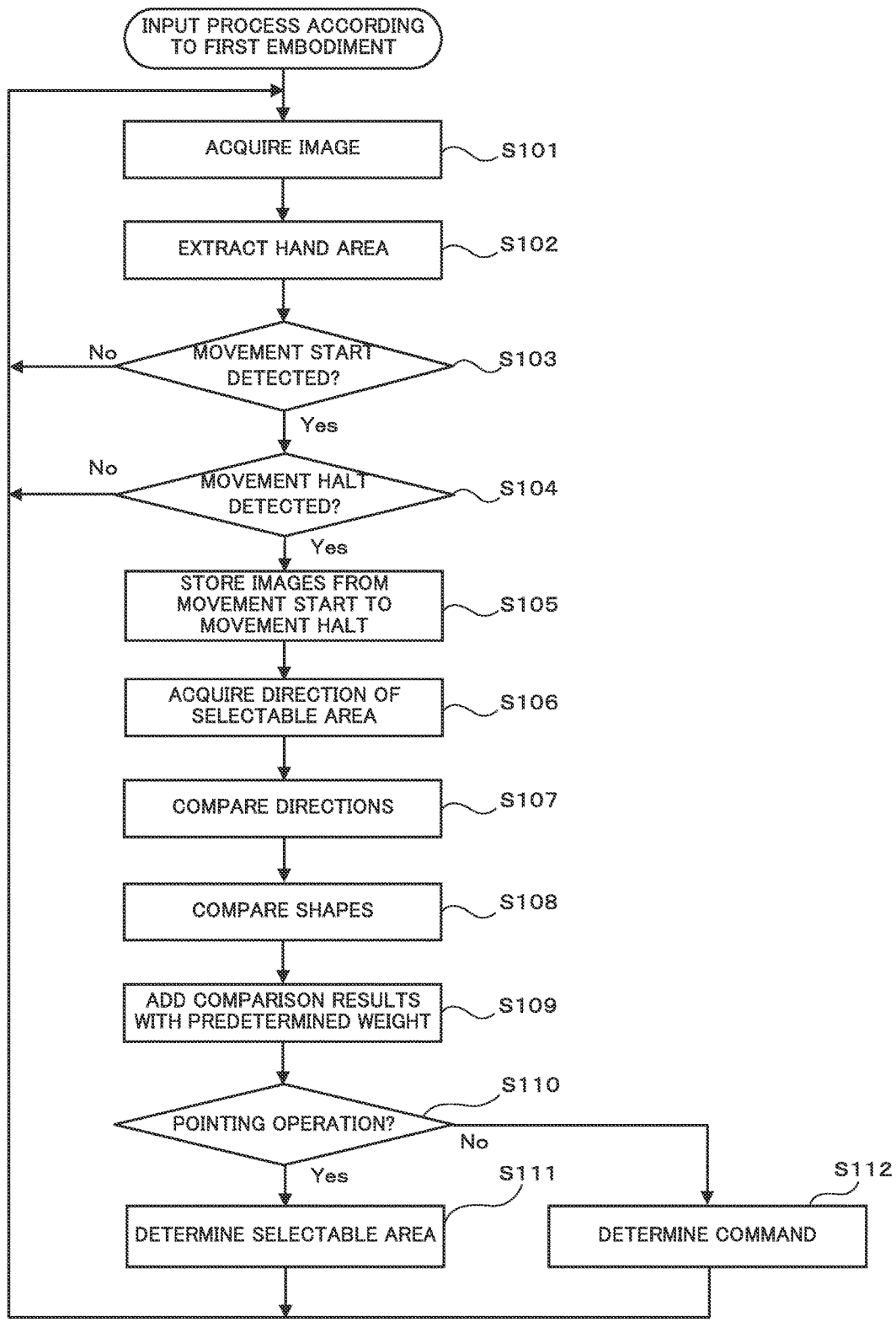

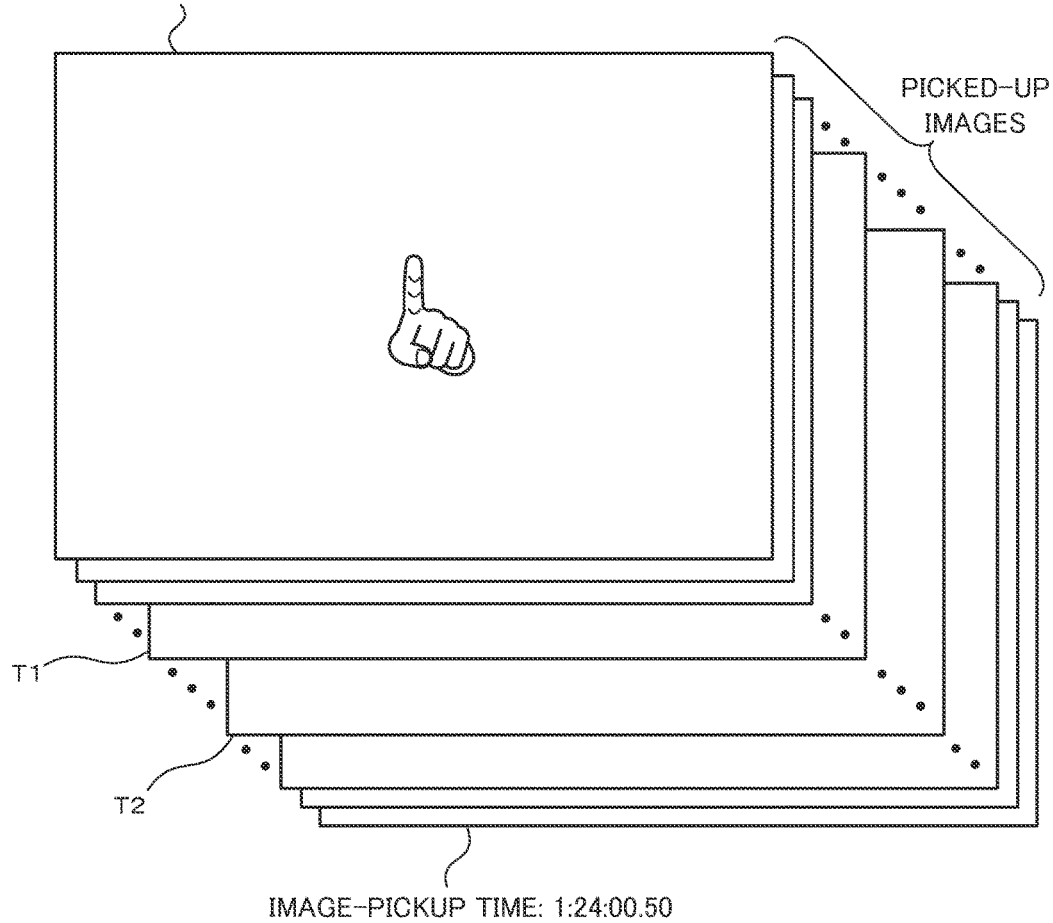

[FIG.10]
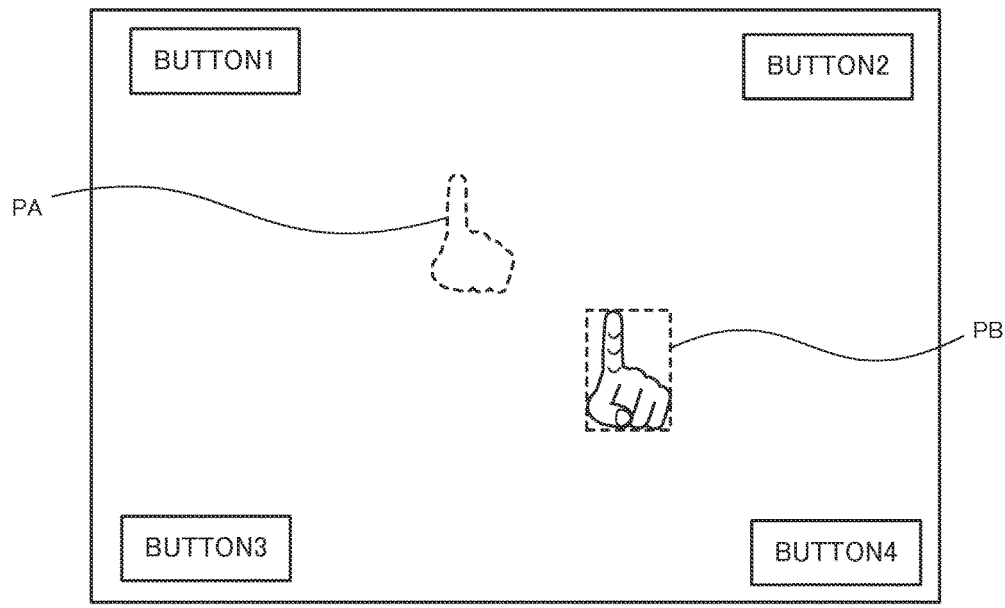
[FIG.11]
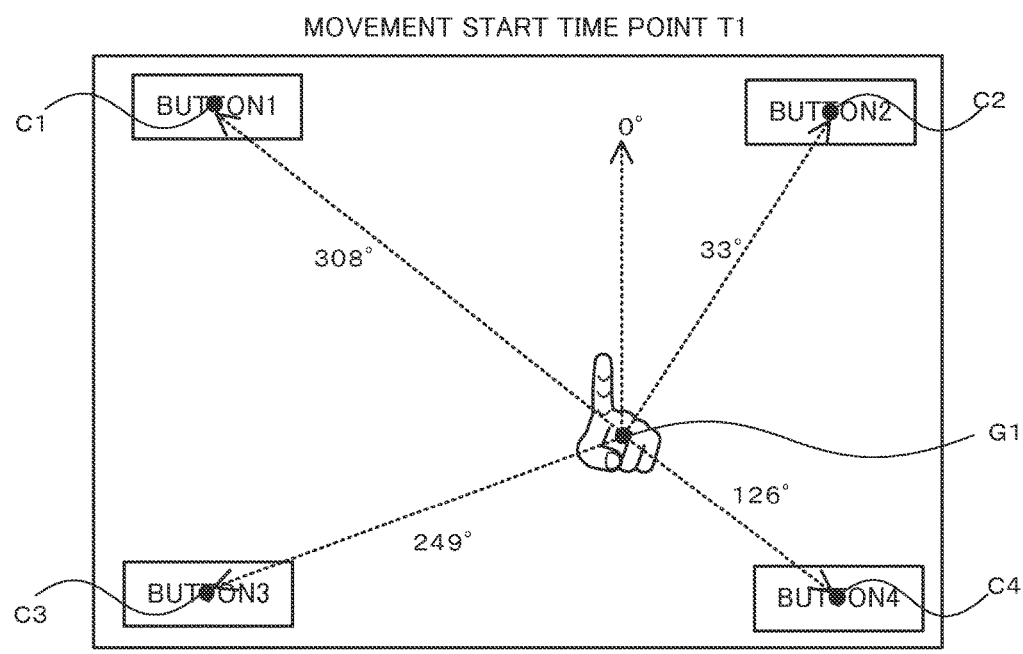

[FIG.12A]
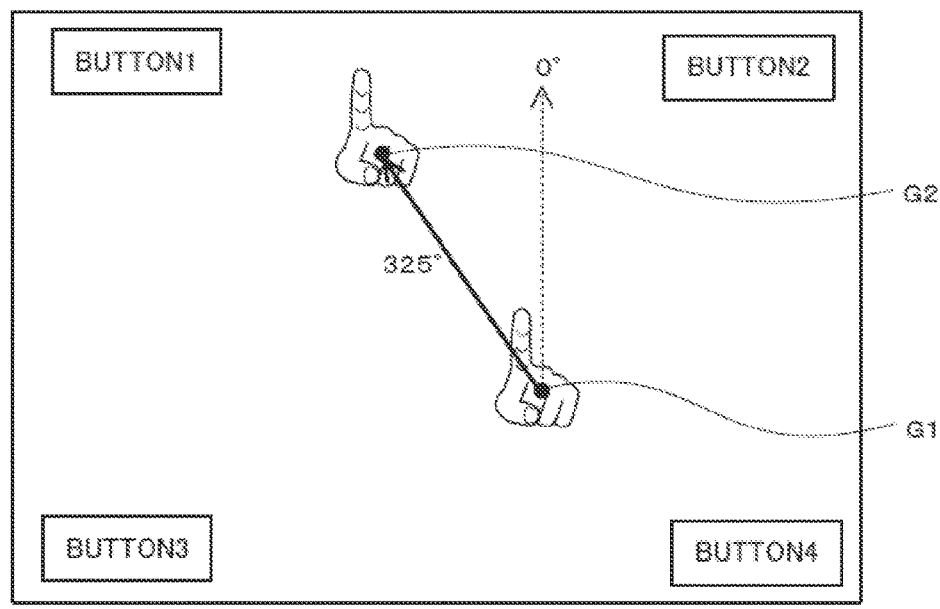
[FIG.12B]
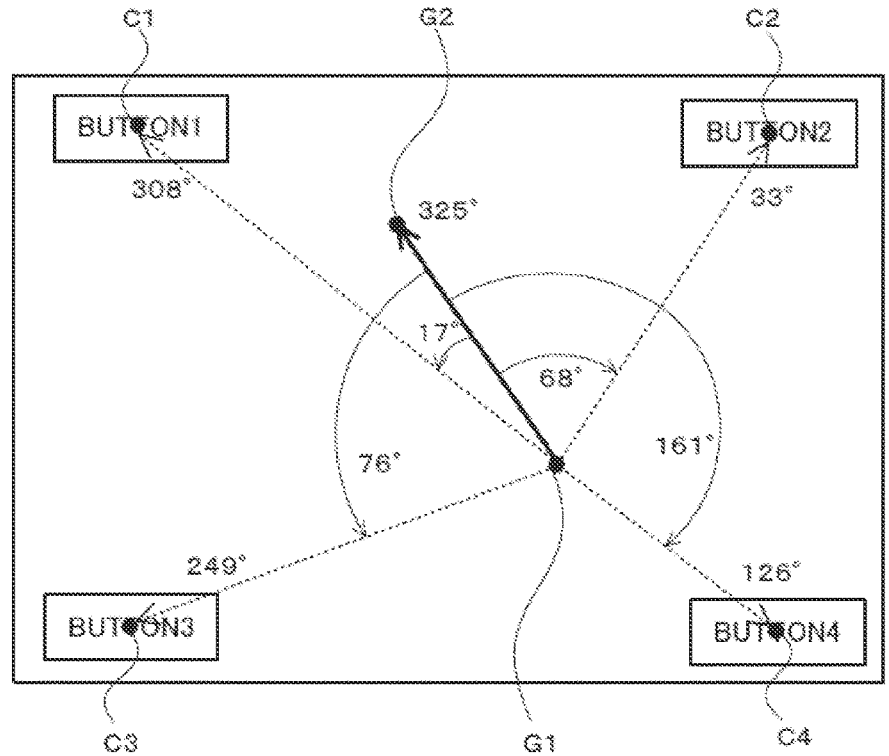

[FIG.13A]
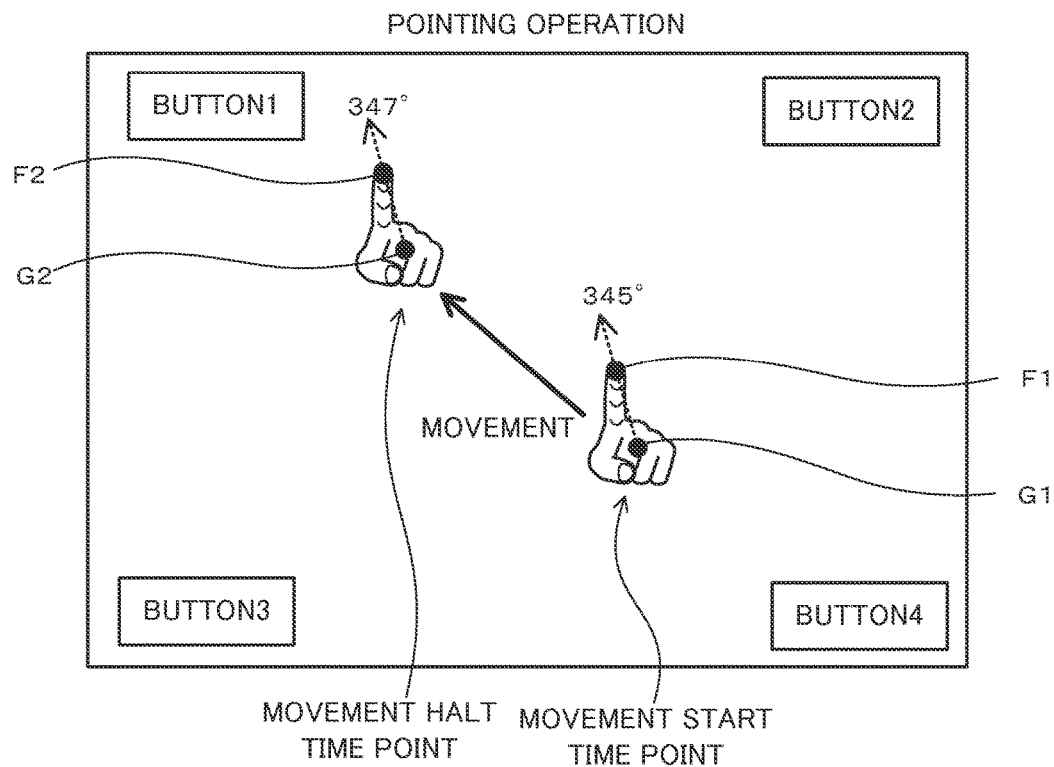
[FIG.13B]
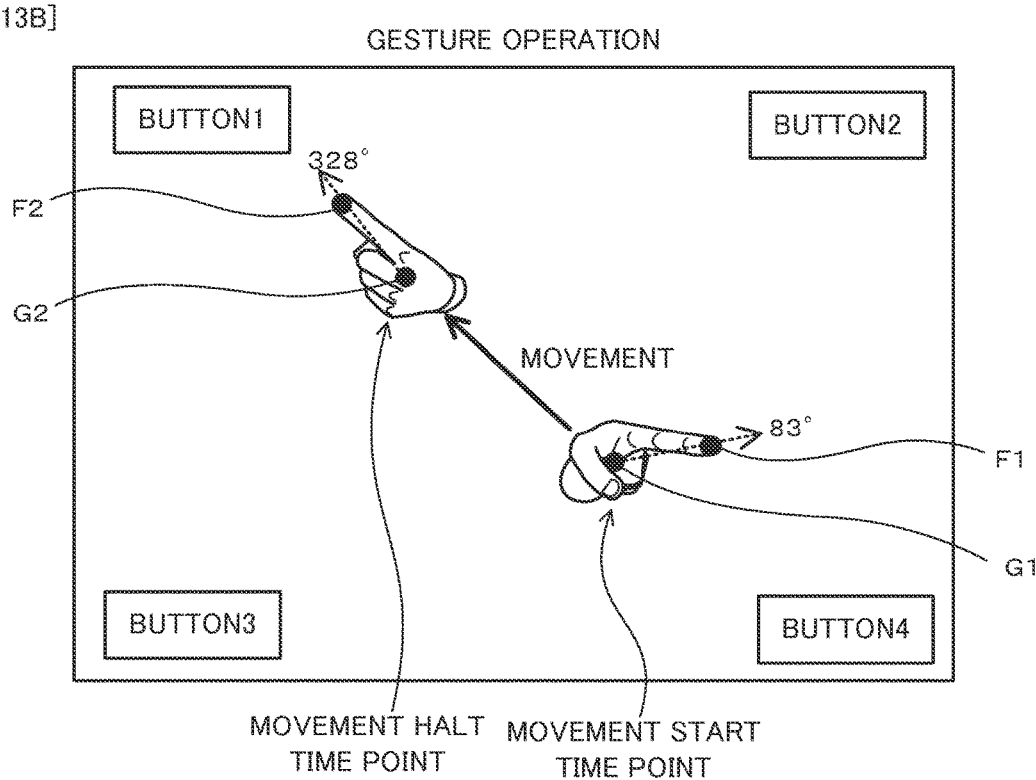

[FIG.14]
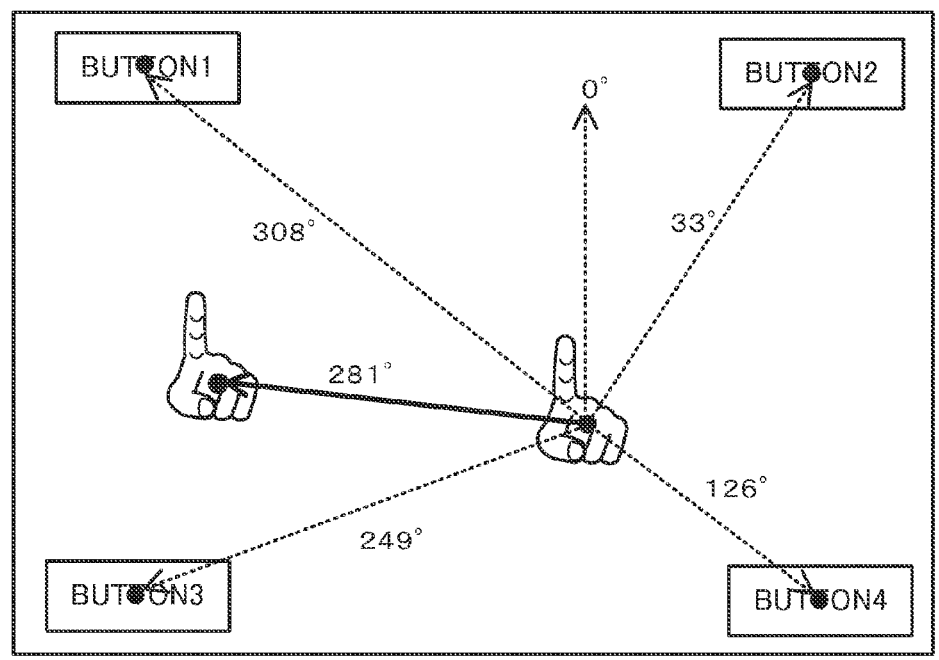

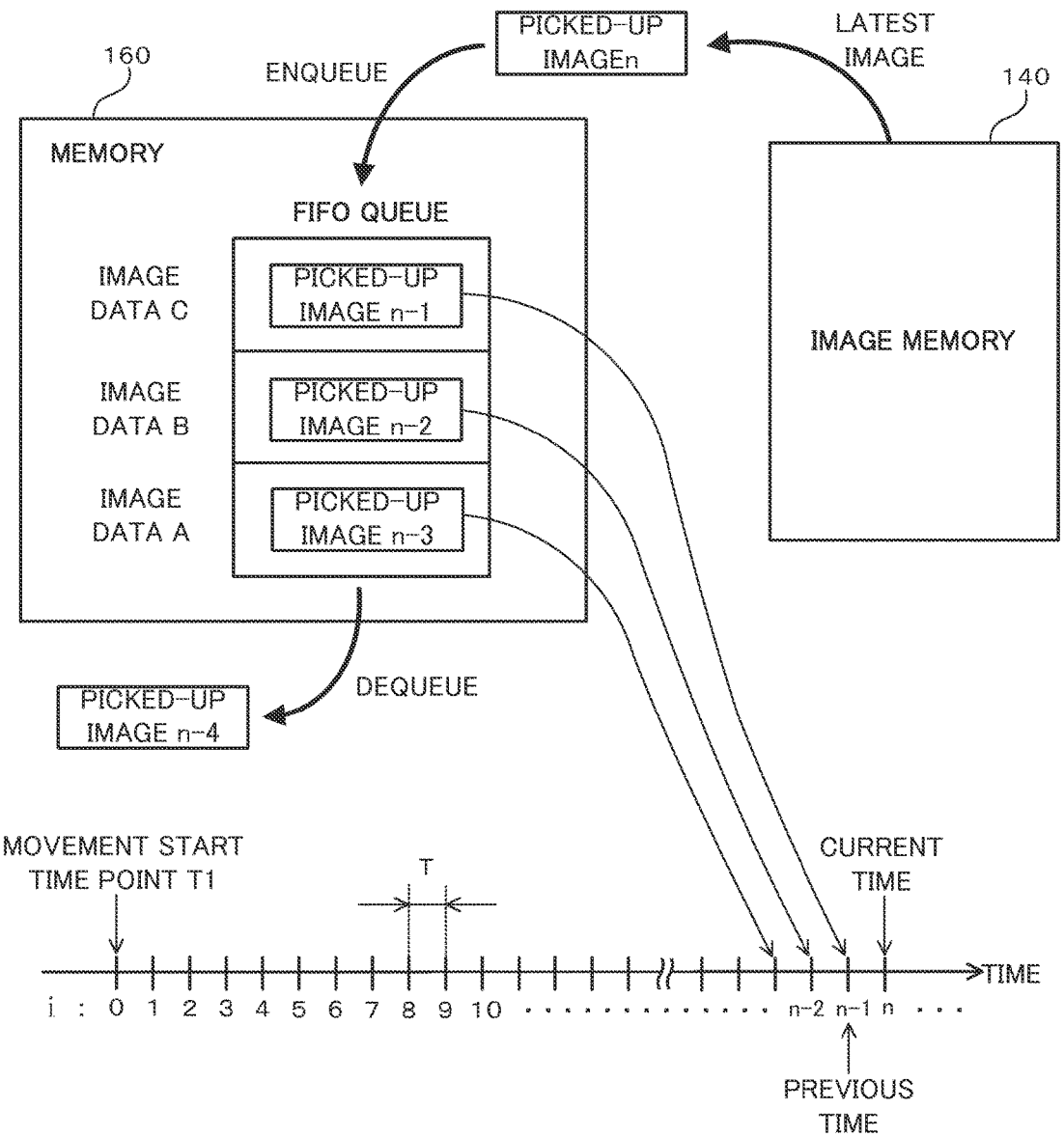

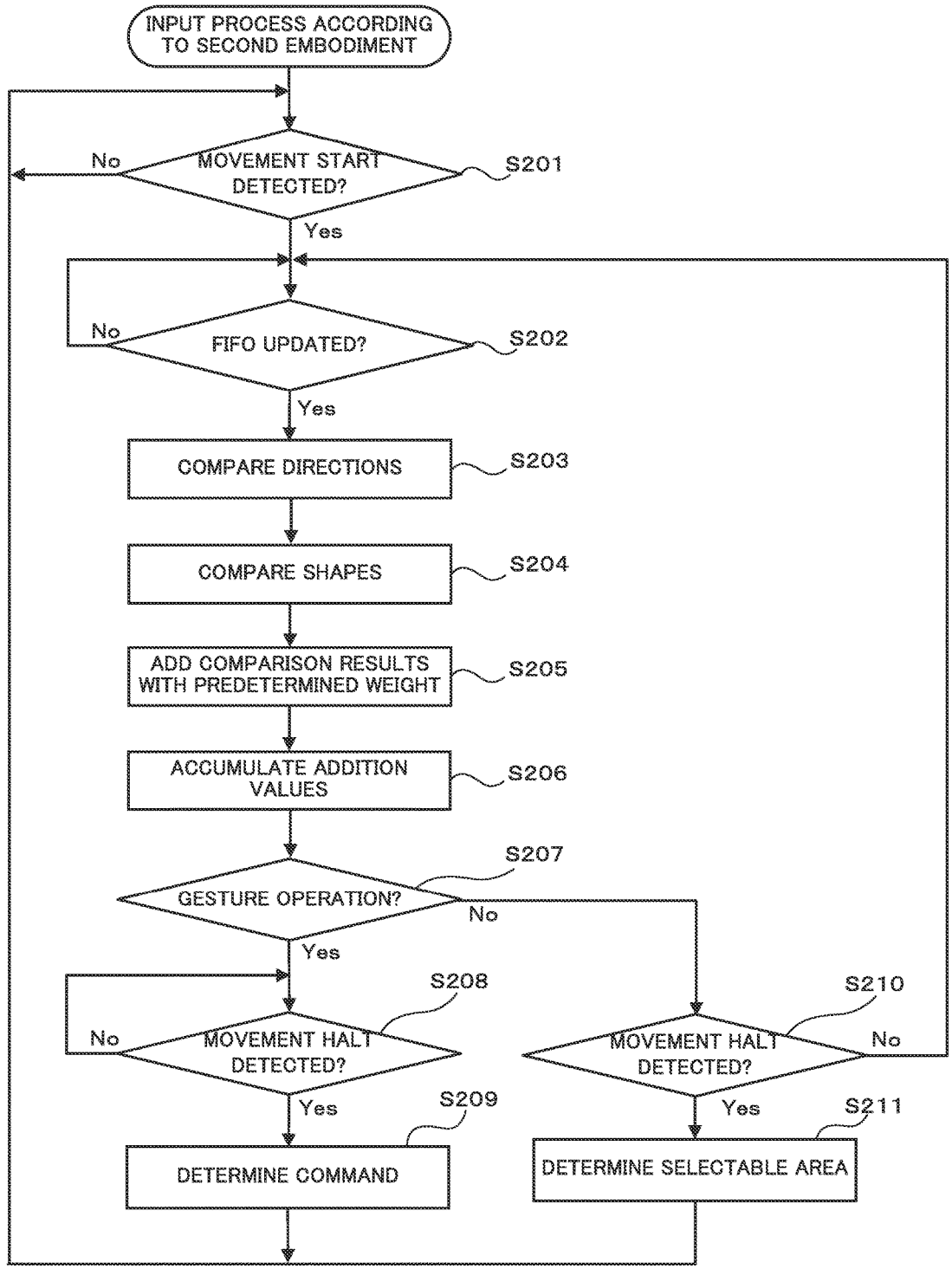

[FIG. 17A]
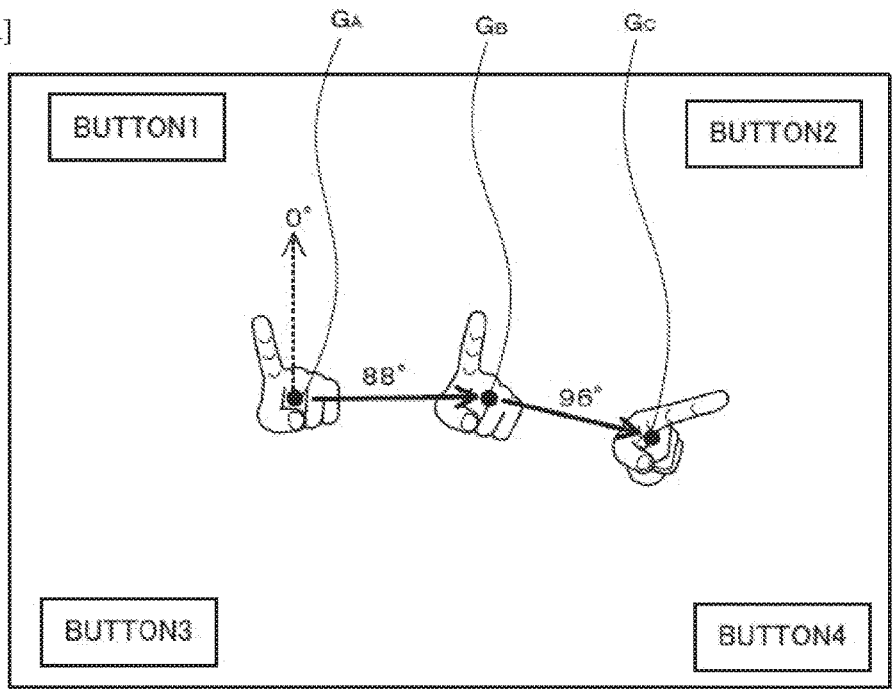
[FIG. 17B]
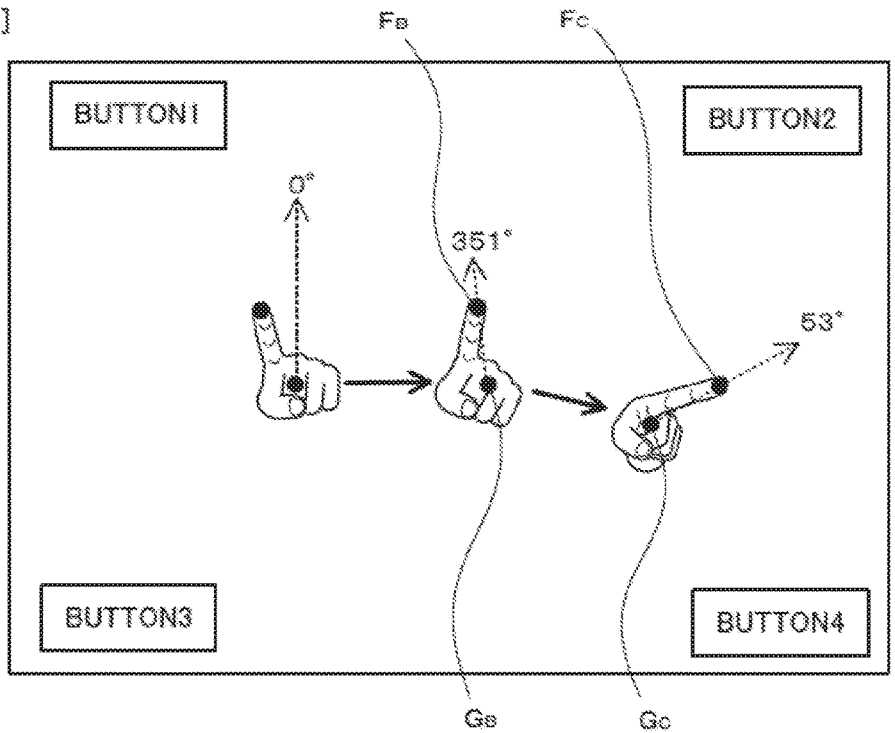

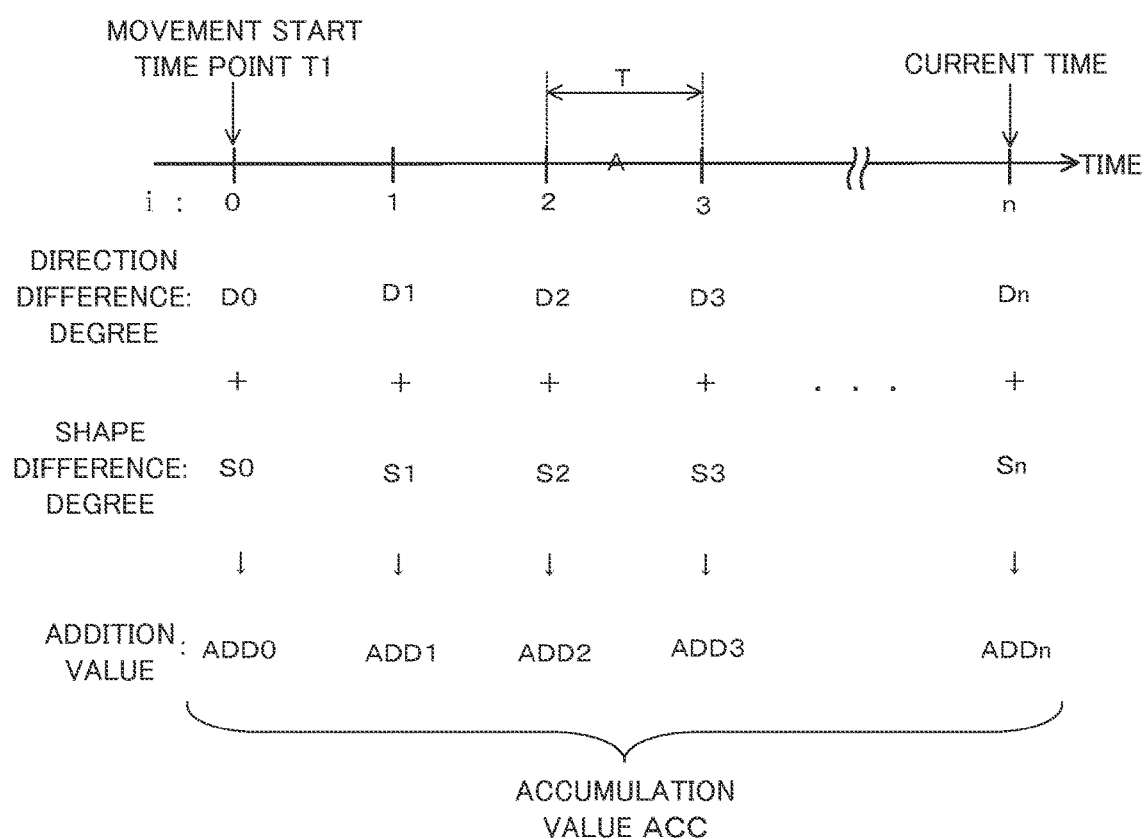
[FIG.18]

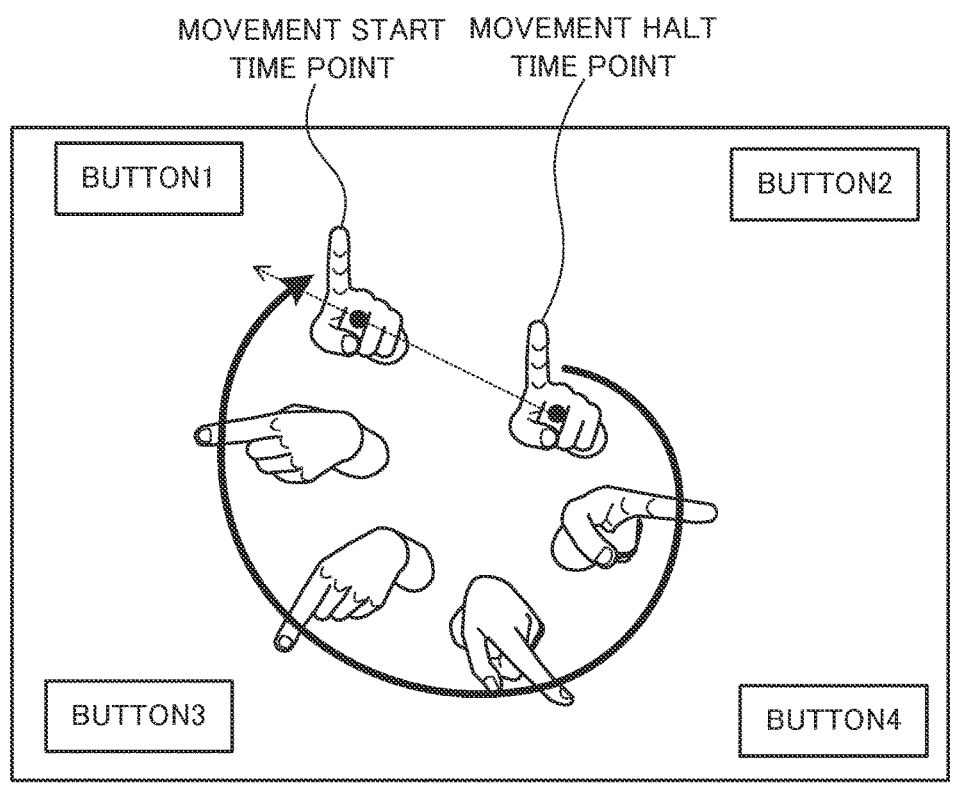
[FIG.19]

[FIG.20A]
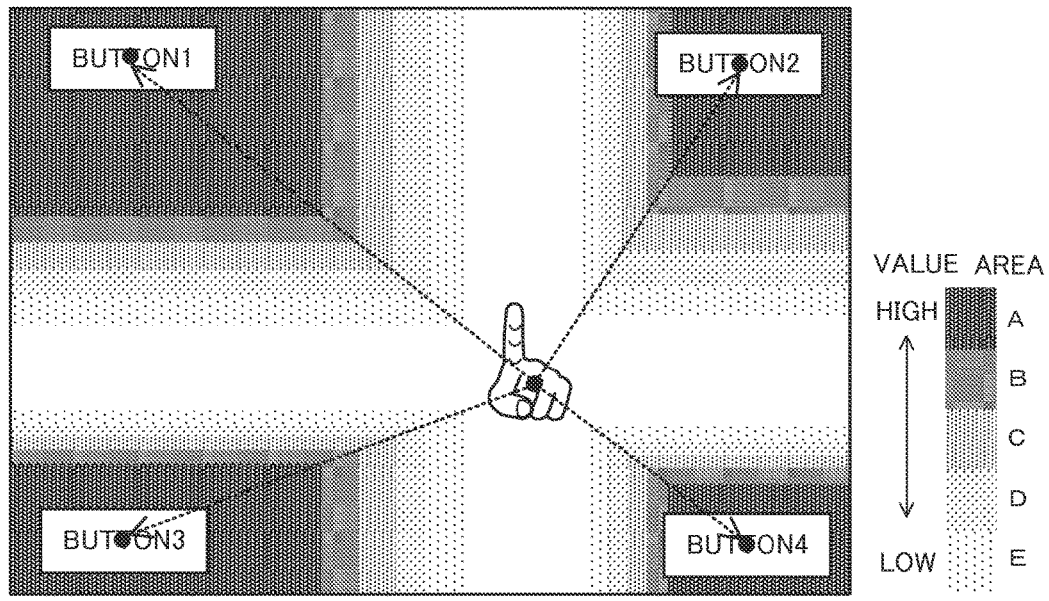
[FIG.20B]
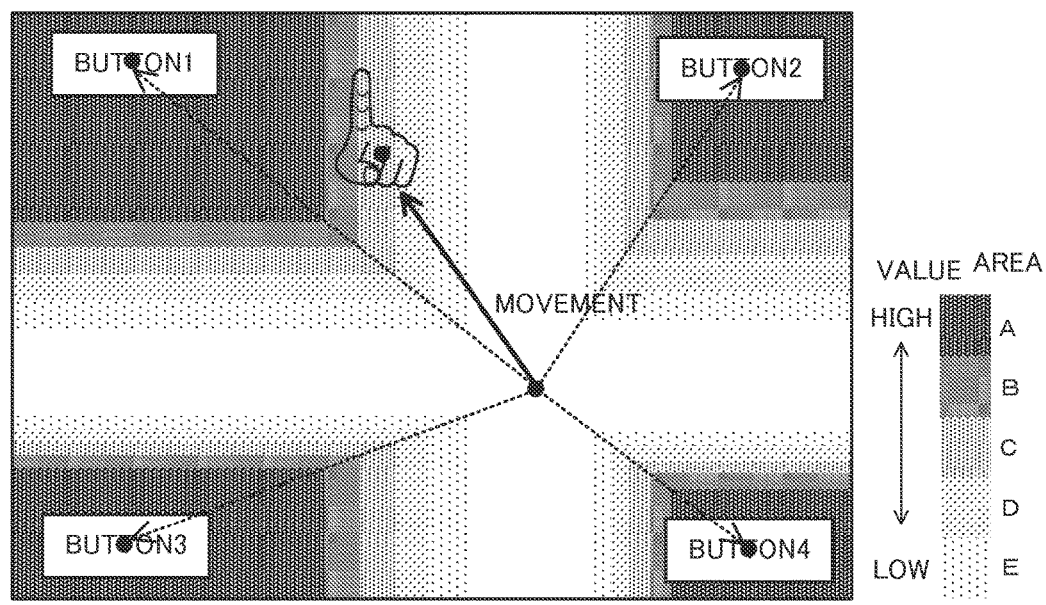

[FIG.21A]
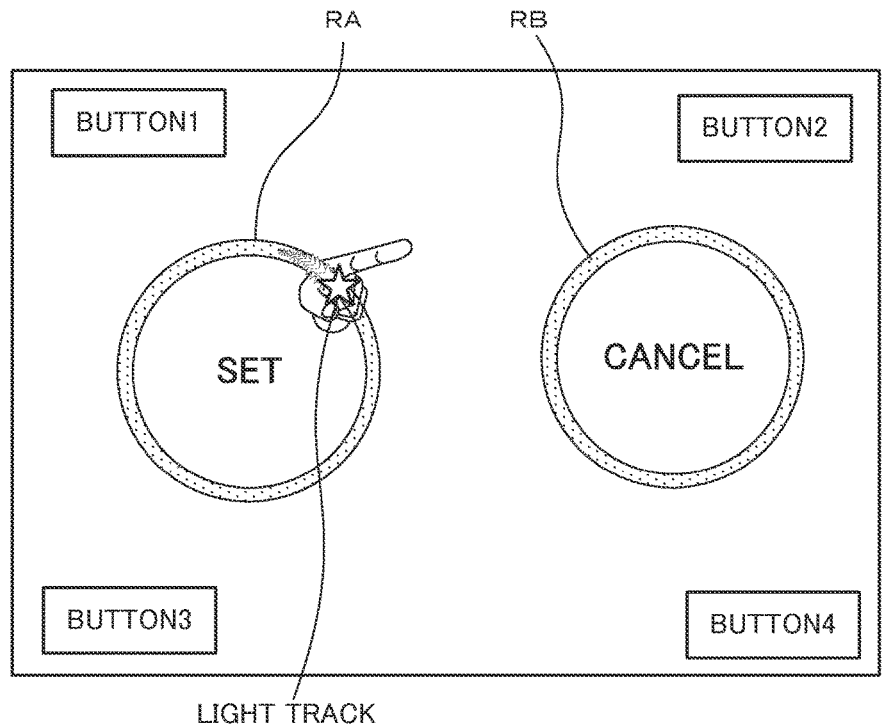
[FIG.21B]
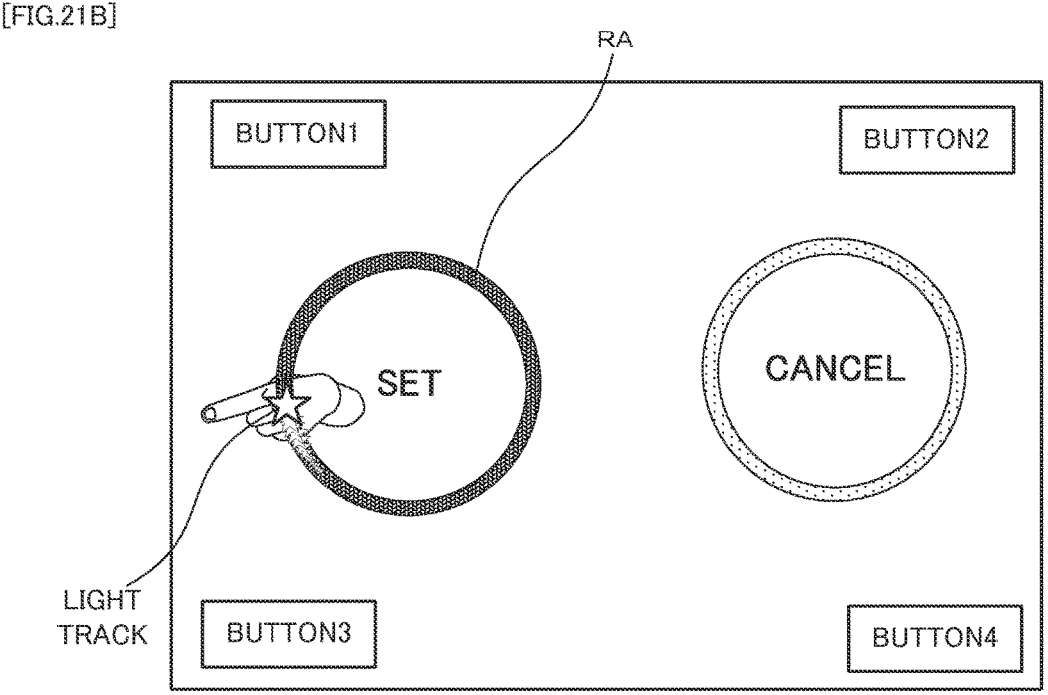

[FIG.22]
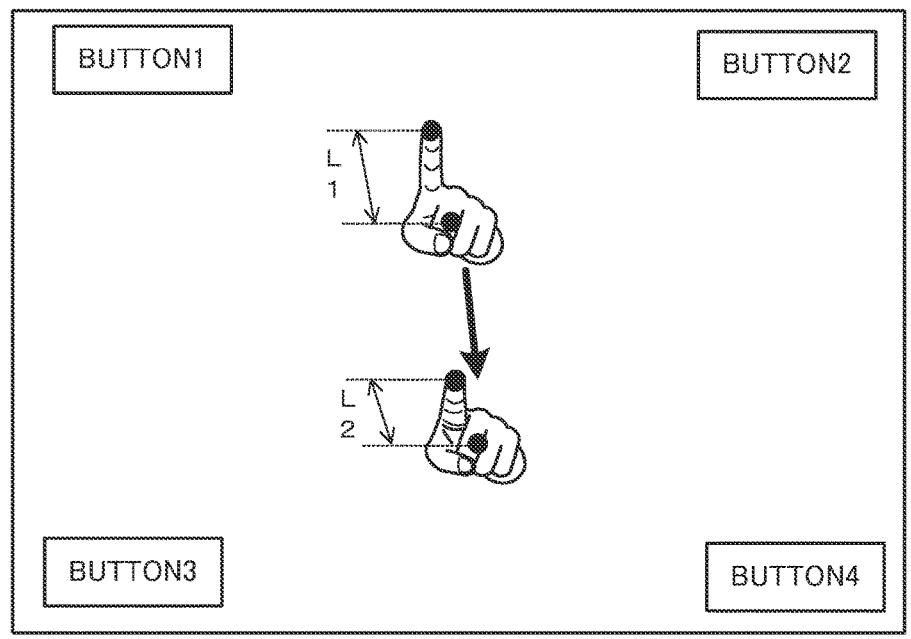

[FIG.23A]
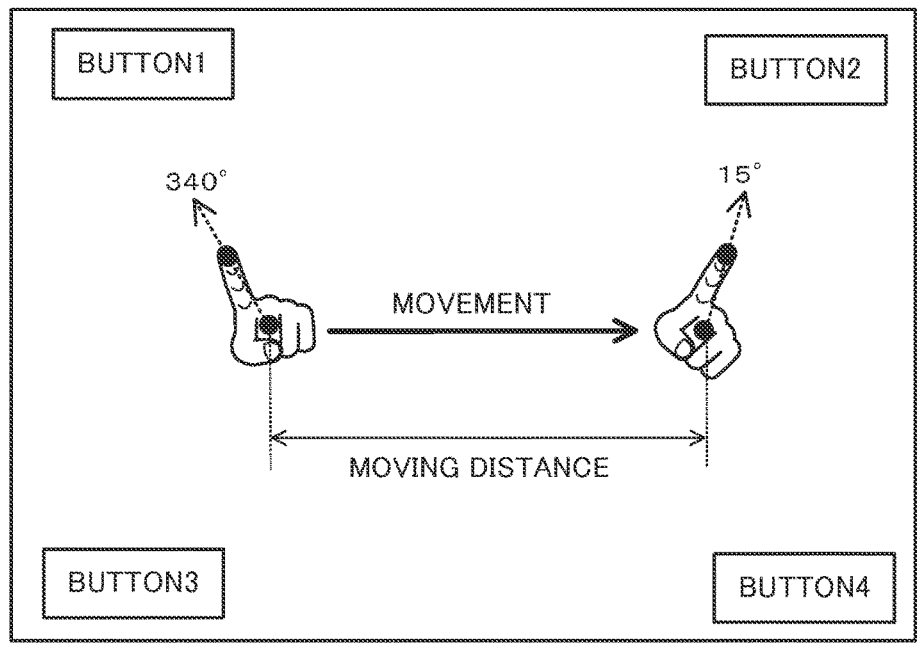
[FIG.23B]
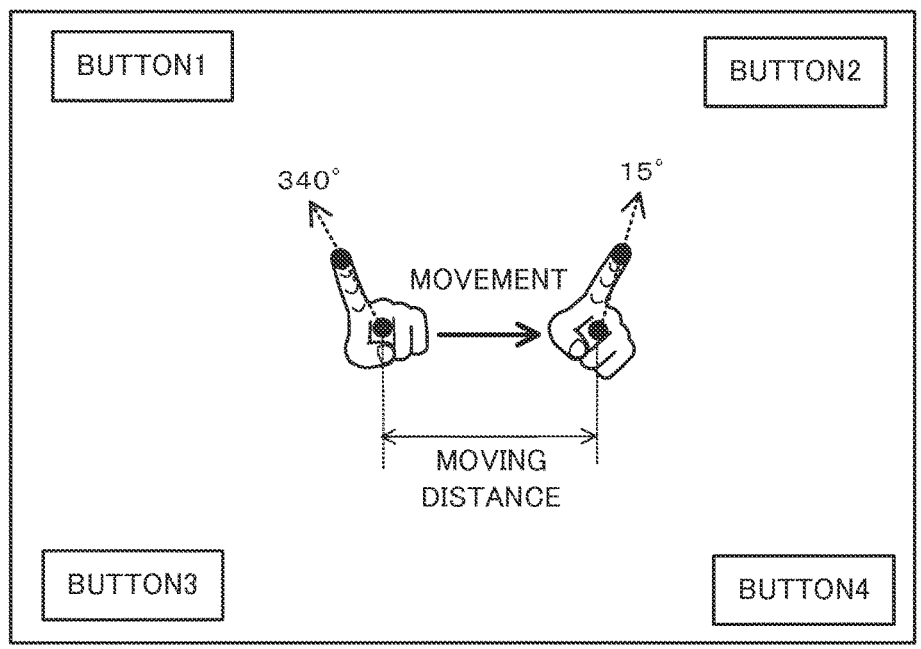

INPUT DEVICE, INPUT METHOD, AND STORAGE MEDIUM

CROSS-REFERENCE TO RELATED APPLICATIONS

The present application is a national stage application of International Application No. PCT/JP2013/071893 entitled "INPUT DEVICE, INPUT METHOD, AND STORAGE MEDIUM," filed on Aug. 13, 2013, which claims the benefit of priority of Japanese Patent Application No. 2012-181223, filed on Aug. 17, 2012, the disclosures of which are incorporated herein in their entirety by reference thereto.

TECHNICAL FIELD

The present disclosure relates to an input device, an input method, and a non-transitory recording medium.

BACKGROUND ART

An input device that determines an operation instruction from a user based on the motion of a hand of the user is known. For example, Patent Literature 1 discloses an image recognition device that determines an operation by a user based on the hand motion of the user operating a virtual operation screen depicted using a three-dimensional display. In addition, Patent Literature 2 discloses a display control device that sets a way of arrangement of images to be displayed on a display based on a picked-up gesture of a user. Still further, Patent Literature 3 discloses an information processing device that determines whether or not a touch operation by a user is a depress operation (tap operation) or a gesture operation based on the movement amount of the touch operation to a touch panel.

CITATION LIST

Patent Literature

Patent Literature 1: Unexamined Japanese Patent Application Kokai Publication No. 2011-175623
Patent Literature 2: Unexamined Japanese Patent Application Kokai Publication No. 2011-248606
Patent Literature 3: Unexamined Japanese Patent Application Kokai Publication No. 2009-151691

SUMMARY OF INVENTION

Technical Problem

Relating to the technology disclosed in Patent Literature 1, there is a device which associates a picked-up image with an operation screen having one or more defined selectable areas (for example, a display area of buttons and icons) subjected to a select operation, and which recognizes a user's operation (hereinafter, referred to as "select operation") of selecting within the selectable areas based on the hand motion of the user (for example, a hand halting for a certain time period at a position corresponding to the selectable area) during the image-pickup. According to such an input device, if a gesture operation different from the select operation can be determined in addition to the select operation, the number of variations of the operation increases, and thus it becomes more convenient for a user.

In the case of a touch panel, when the selectable area displaying icons and the like is selected through a tap operation, what the user touches with a finger is only the selectable area, and when the finger moves to the selectable area, the finger is released from the touch panel. Hence, the hand motion of the user while moving to the selectable area is not detected by the touch panel. Accordingly, as is suggested in, for example, Patent Literature 3, the input device can easily determine whether the touch motion is a select operation (tap operation and the like) or a gesture operation based on only information on the movement amount of the hand of the user captured by the touch panel.

When, however, the hand motion of the user is picked up by not the touch panel but a camera to determine the input by the user, the hand motion of the user moving to the selectable area is picked up by the camera. That is, depending on the presence/absence of detection, it is difficult to distinguish a hand motion prior to a select operation from a gesture motion. Hence, according to the technology disclosed in Patent Literature 3, it is difficult to distinguish a select operation to the selectable area from a gesture motion, and thus it is difficult to increase the number of variations of operations determinable for the input device.

The present disclosure has been made in view of the aforementioned circumstances, and it is an objective of the present disclosure to provide an input device, an input method, and a non-transitory recording medium that can determine a gesture operation in addition to a select operation.

Solution to Problem

An input device according to a first aspect of the present disclosure determines an input by a user based on a motion of a hand of the user in a picked-up images associated with an operation screen having one or more defined selectable areas, and the input device includes: an input determining means that determines whether or not the input by the user is a select operation of a selectable area or is a gesture operation different from the select operation based on a change in shape of the hand in a plurality of the picked-up images, the change in shape of the hand being caused by the moving hand.

An input method according to a second aspect of the present disclosure is for determining an input by a user based on a motion of a hand of the user in picked-up images associated with an operation screen displaying one or more selectable areas subjected to a select operation, and the method includes: determining whether the input by the user is the select operation of a selectable area or is a gesture operation different from the select operation based on a change in shape of the hand in a plurality of the picked-up images, the change in shape of the hand being caused by the moving hand.

A computer-readable non-transitory recording medium according to a third aspect of the present disclosure has stored therein a program, and the program causes a computer that controls an input device determining an input by a user based on a motion of a hand of the user in a picked-up images associated with an operation screen displaying one or more selectable areas to execute: an input determination function of determining whether the input by the user is a select operation of a selectable area or is a gesture operation different from the select operation based on a change in shape of the hand in a plurality of the picked-up images, the change in shape of the hand being caused by the moving hand.

Advantageous Effects of Invention

According to the present disclosure, it becomes possible to provide an input device, an input method, and a non-transitory recording medium that can determine a gesture operation in addition to a select operation.

BRIEF DESCRIPTION OF DRAWINGS

FIG. 1 is a diagram illustrating an input condition through an input device according to an embodiment of the present disclosure;

FIG. 2A is a diagram illustrating an operation screen displayed on a display of the input device;

FIG. 2B is a diagram illustrating a picked-up image picked up by an imager of the input device;

FIG. 2C is a diagram illustrating how the operation screen of the input device is associated with a picked-up image;

FIG. 3A is a diagram for explaining a gesture operation;

FIG. 3B is a diagram for explaining a gesture operation;

FIG. 3C is a diagram for explaining a select operation;

FIG. 4 is a block diagram illustrating an internal configuration of the input device illustrated in FIG. 1;

FIG. 5 is a functional block diagram for explaining a function of a controller illustrated in FIG. 4;

FIG. 6 is a diagram for explaining a gesture determination table and a command table both stored in a memory illustrated in FIG. 4;

FIG. 7A is a diagram for explaining a motion pattern drawing a clockwise circle among hand motion patterns of a user;

FIG. 7B is a diagram for explaining a motion pattern drawing of a counterclockwise circle as an example of the hand motion patterns of the user;

FIG. 7C is a diagram for explaining a motion pattern of a straight movement in the left direction as an example of the hand motion patterns of the user;

FIG. 7D is a diagram for explaining a motion pattern of a straight movement in the right direction as an example of the hand motion patterns of the user;

FIG. 8 is a flowchart of an input process according to a first embodiment;

FIG. 9 is a diagram for explaining a picked-up image utilized in the input process;

FIG. 10 is a diagram for explaining a hand area;

FIG. 11 is a diagram illustrating how a direction to a selectable area is specified;

FIG. 12A is a diagram illustrating how a movement direction of the user's hand is specified when comparing the direction to the selectable area with the movement direction of the user's hand;

FIG. 12B is a diagram illustrating how a direction difference degree is calculated based on the direction to the selectable area and the movement direction of the user's hand when comparing the direction to the selectable area with the movement direction of the user's hand;

FIG. 13A is a diagram illustrating a change in shape of the user's hand at the time of a select operation;

FIG. 13B is a diagram illustrating a change in shape of the user's hand at the time of a gesture operation;

FIG. 14 is a diagram for explaining an effect of the input device of the first embodiment;

FIG. 15 is a diagram for explaining an FIFO queue prepared in the memory illustrated in FIG. 4;

FIG. 16 is a flowchart of an input process according to a second embodiment;

FIG. 17A is a diagram illustrating how a change in movement direction of the user's hand is specified when specifying the movement direction of the user's hand and a change in shape thereof;

FIG. 17B is a diagram illustrating how a change in shape of the user's hand is specified when specifying the movement direction of the user's hand and the change in shape thereof;

FIG. 18 is a diagram illustrating how the direction difference degree, a shape difference degree, and an addition value are calculated for each certain time interval;

FIG. 19 is a diagram for explaining an effect of the input device of the second embodiment;

FIG. 20A is a diagram for a modified example of the input device, and is a diagram for explaining a direction comparison map created with reference to the direction to the selectable area, and the position of the user's hand at a time at which the movement starts;

FIG. 20B is a diagram illustrating how the direction difference degree is specified based on the direction comparison map;

FIG. 21A is a diagram illustrating how a motion trajectory of the user's hand is displayed as a light track in order to explain an operation of a feed-backer;

FIG. 21B is a diagram illustrating how the transparency of a circular guide indicator changes based on an accumulation value;

FIG. 22 is a diagram for explaining a modified example of the input device;

FIG. 23A is a diagram illustrating a process when the moving speed of the user's hand is fast in order to explain a modified example of the input device; and FIG. 23B is a diagram illustrating a process when the moving speed of the user's hand is slow.

DESCRIPTION OF EMBODIMENTS

An input device according to an embodiment of the present disclosure will be explained below with reference to the accompanying drawings.

First Embodiment

An input device 100 of this embodiment includes a function for determining an input (for example, a user's operation instruction to a device, a selection within selectable areas displaying commands, icons, and the like) from a user to a device based on a hand motion of the user picked up by a camera. The input device 100 is, for example, a personal computer having an external appearance as illustrated in FIG. 1. First, an outline of the process executed by the input device 100 will be explained with reference to FIGS. 2 and 3.

The input device 100 includes a display 120 that displays, for example, an operation screen illustrated in FIG. 2A and displaying images (icons and buttons) in the selectable area subjected to a selection, and an imager 130 that picks up, for example, an image illustrated in FIG. 2B. As illustrated in FIG. 2C, the image picked up (hereinafter, referred to as a "picked-up image") is associated with the operation screen. For example, the input device 100 associates each coordinate point on the picked-up image with a coordinate point on the operation screen through a coordinate conversion like affine transformation. Next, when a fingertip of a user is reflected on a portion of the picked-up image, this is accepted as an operation pointing out the associated portion on the operation screen. Hence, an operation of specifying a position on the operation screen can be input without a pointing device, such as a mouse or a touch panel. The selectable area is set on the operation screen in accordance with the condition of an application that is a target of an input operation. The selectable area may simultaneously display, for example, an image of a depressable button, an image of an icon subjected to selection, and the like. Alternatively, in the cases of portions recognizable for the user, such as an upper end of the screen and a lower end thereof, a setting of not displaying a special image in the selectable area is possible. The input device 100 communicates, for example, an application to obtain the coordinates of the selectable area, and stores the obtained coordinates in a RAM. In the following explanation, it is presumed that the coordinates of the selectable area are obtainable in any time with reference to the predetermined area in the RAM. As a specific kind of an operation input, the input device 100 determines, based on the hand motion of the user in the picked-up images, whether or not an input by the user is a select operation or a gesture operation different therefrom. In this case, a "gesture operation" is a predetermined action like a body language signal and a hand gesture defined in advance to operate the device, for example, a circular motion of a hand as illustrated in FIG. 3A, a motion of pivoting a hand around a wrist and an elbow with a finger pointing as illustrated in FIG. 3B (hereinafter, this motion will be referred to as a "flick motion"), and a motion of rotating a hand (hereinafter, referred to as a "rolling motion"), and the like. In addition, a "select operation" (also referred to as a "pointing operation") is a user's motion of selecting within the selectable area displayed on the screen. The "select operation" includes a hand motion of the user while moving to a point area.

When the user performs a select operation, the hand of the user moves towards the selectable area. In this case, the user often moves the hand horizontally while viewing the operation screen, and thus as illustrated in FIG. 3C, for example, the picked-up shape of the hand changes minimally. Conversely, in the case of a gesture operation, the user often moves the hand while pivoting the hand around the wrist, and thus as illustrated in FIGS. 3A and 3B, for example, the picked-up shape of the hand changes significantly. The input device 100 determines whether the input by the user is a select operation or a gesture operation based on a change in shape of the user's hand caused by a movement.

A detailed explanation will be given of the configuration of the input device 100 below.

As illustrated in FIG. 4, the input device 100 includes an operation device 110, a display 120, an imager 130, an image memory 140, a controller 150, and a memory 160.

The operation device 110 is an input device like a keyboard. The operation device 110 accepts, for example, a process start instruction from the user, and transmits the accepted instruction to the controller 150 to be discussed later.

The display 120 is a display device like a liquid crystal display. The display 120 displays various images in accordance with a control by the controller 150.

The imager 130 is an image-pickup device, such as a CCD (Charge Coupled Device Image Sensor) camera or a CMOS (Complementary Metal Oxide Semiconductor) camera. The imager 130 is provided at, for example, the upper center of the display 120. The imager 130 sequentially picks up images of the hand of the user (including moving image), adds an image-pickup time to each frame, and sequentially transmits such images to the image memory 140.

The image memory 140 is a video memory like a RAM (Random Access Memory). The image memory 140 stores pieces of image data transmitted from the imager 130.

The controller 150 includes, for example, an arithmetic device like a processor, a RAM that can be utilized as a work area for this arithmetic device, and a ROM (Read Only Memory) that stores programs and data including an initial value and the like. The controller 150 operates in accordance with a program loaded from the ROM in the RAM, and executes various processes including an "input process" to be discussed later. The controller 150 operates in accordance with the "input process", thereby serving as, as illustrated in FIG. 5, an image acquirer 151, a movement detector 152, a direction comparator 153, a shape comparator 154, an input determiner 155, and a transmitter 156. Note that those functions will be explained in the later explanation for the "input process".

The memory 160 is a memory device that can read therefrom and write therein data, such as a DRAM (Dynamic Random Access Memory), an SRAM (Static Random Access Memory), a flash memory, or a hard disk. The memory 160 stores various data including a "gesture determination table" and a "command table".

The "gesture determination table" is information to match hand gesture and trajectory with which one of the multiple motion patterns stored in advance. "Motion pattern information" is information associating "identification information" with "feature data" as illustrated in FIG. 6.

The "identification information" is information (identifier) that uniquely identifies each of the multiple motion patterns which are stored in advance and are motion patterns of the hand of the user. For example, in the example case in FIG. 6, unique identification information is allocated to each of different motions of the hand from one another as the motions of the hand of the user, such as "rotate (clockwise motion)" to a clockwise rotating motion as illustrated in FIG. 7A, "rotate (counterclockwise motion)" to a counterclockwise rotating motion as illustrated in FIG. 7B, "linear movement (in the left direction)" to a flick motion in the left direction as illustrated in FIG. 7C. The form of the identification information is not limited to any particular form. For example, such information may be numerical values like 1, 2, 3, and the like, or may be symbols like A, B, C, and the like.

The "feature data" is information to specify the motion pattern of the user's hand. The feature data is constituted by feature amount data obtained by, for example, extracting in advance a feature of the motion trajectory drawn by the user's hand and storing the extracted feature. The feature amount data is stored in the memory device like the ROM in advance, and is utilized for, for example, a determination on a gesture operation through a pattern recognition using a movement vector. The controller 150 checks the trajectory of the user's hand with the feature data, thereby determining with which one of the motion patterns the motion trajectory of the user's hand matches.

The "command table" is information to determine with which one of the multiple operation commands the gesture operation by the user matches. As illustrated in FIG. 6, the command table includes information associating the "identification information" with a "control command".

The "control command" is control information used in order to control a device. Example "control commands" are commands such as play, stop, fast-feed, skip, set, cancel, and volume change, all input to an application software like a music player software or an operating system.

Next, an explanation will be given of an operation of the input device 100 employing the above-explained configuration.

When receiving the process start instruction from the operation device 110, the controller 150 instructs the imager 130 to start picking up images. When instructed to start image-pickup, the imager 130 sequentially transmits picked-up images to the image memory 140. In addition, when receiving the process start instruction from the operation device 110, the controller 150 runs application software, and starts the "input process" to input various control information to this application software. The "input process" will be explained below with reference to the flowchart of FIG. 8.

The image acquire 151 of the controller 150 acquires picked-up images by what corresponds to a latest predetermined time period at which the images of the hand of a human are picked up from the image memory 140 (for example, as illustrated in FIG. 9, image data of multiple frames for 20 seconds from an image-pickup time of 1:23:40.50 to an image-pickup time of 1:24:00.50) (step S101). That is, the controller 150 acquires multiple picked-up images with different image-pickup timings from the image acquirer 151.

Returning to the flow in FIG. 8, the movement detector 152 of the controller 150 extracts, from each of the multiple frames of the picked-up images, an area where a hand with an pointing index finger is photographed (hereinafter, referred to as a "hand area") (step S102). The hand area to be extracted may be the shape of the hand itself (for example, a portion PA surrounded by dashed lines in FIG. 10), or may be the smallest rectangular area surrounding the hand (for example, a portion PB surrounded by dashed lines in FIG. 10).

Returning to the flow in FIG. 8, the movement detector 152 determines whether or not the start of movement is detected based on a change in position of the hand area in respective frames of the picked-up images (step S103). As a specific example, the movement detector 152 compares the positions of the hand area in the multiple picked-up images acquired in the step S101, and acquires a moving speed of the hand based on the difference (hand movement amount) of the positions of the hand area in the respective frames, and the difference (time difference) of the image-pickup timings. Next, based on the acquired speed, it is determined whether or not, in the predetermined time period at which the images are picked up in the step S101, there is a time point at which the condition of the user's hand transitions from a halt condition (a condition in which the moving speed of the hand is equal to or slower than a certain speed) to a moving condition (a condition in which the moving speed of the hand becomes equal to or faster than the certain speed). When there is no such a transition time point, the movement detector 152 determines (step S103: NO) that the user's hand does not transition to the moving condition, returns the process to the step S101, and repeats the processes in the steps S101 to S103 until detecting the transition time point. Conversely, when the user's hand transitions to the moving condition (step S103: YES), the image-pickup time (hereinafter, referred to as a movement start time point T1) at a time point at which the condition transitions to the moving condition is stored in the RAM or the like, and the process progresses to step S104.

The movement detector 152 determines, based on the change in position of the hand area in each frame after the start of movement, whether or not there is a time point at which the user's hand transitions from the moving condition to the halt condition in the picked-up images after the movement start time point T1 (step S104). The movement detector 152 determines, based on the moving speed of the hand acquired on the basis of the difference (hand movement amount) of the positions of the hand area and the difference (time difference) of the image-pickup timings, whether or not there is a time point at which the user's hand transitions from the moving condition to the halt condition inversely to the step S103. As a result, when the user's hand does not transition to the halt condition (step S104: NO), the process returns to the step S101, and the processes in the steps S101 to S104 are repeated. When the user's hand transitions to the halt condition (step S104: YES), the image-pickup time (hereinafter, referred to as a movement halt time point T2) at which the condition transitions to the movement halt condition is stored in the RAM or the like, and the process progresses to step S105.

The movement detector 152 acquires the picked-up image at the movement start time point T1 and the picked-up image at the movement halt time point T2 from the image memory 140, and stores those image pieces in the RAM (step S105). When, for example, the movement start time point T1 that is 1:23:45.67 is detected in the step S103, and the movement halt time point T2 that is 1:23:46.67 is detected in the step S104, the two frames (the frame at 1:23:45.67 and the frame at 1:23:46.67) of the picked-up images are stored in the RAM.

The direction comparator 153 of the controller 150 specifies (step S106) the direction to the selectable area relative to the position of the user's hand at the movement start time point T1 based on the picked-up image at the movement start time point T1 of the user's hand. This direction can be obtained based on, for example, the coordinates of the weight center of the selectable area recorded in the predetermined are in the RAM and the weight center of the hand area extracted in the step S102. When there are multiple selectable areas, the directions to the respective selectable areas are specified. When, for example, as illustrated in FIG. 11, there are four selectable areas, the direction comparator 153 may specify, as the direction of the selectable area, an angle of a line interconnecting a weight center position G1 of the hand area with the center of each selectable area (C1 to C4) at the movement start time point T1 (for example, a clockwise angle from a predetermined reference direction like an upper direction in the figure, the same is true in each drawing for explaining an angle of the operation screen).

Returning to the flow in FIG. 8, the direction comparator 153 compares the direction to the selectable area acquired in the step S106 with the movement direction of the user's hand. Next, the direction comparator acquires a comparison result as a "direction difference degree" representing a difference degree in the direction. The movement direction of the user's hand can be acquired based on, for example, the positions of the hand area in the frames at the movement start time point T1 and the movement halt time point T2 both stored in the step S105. When there are multiple selectable areas, the direction differences degrees for the respective selectable areas are acquired (step S107). For example, the direction comparator 153 specifies an angle of a line interconnecting the weight center position G1 of the user's hand at the movement start time point T1 and a weight center position G2 of the user's hand at the movement halt time point T2 (for example, an angle when the upper direction in the figure is set to be 0 degree as illustrated in FIG. 12A). Next, as illustrated in FIG. 12B, a difference between the specified angle and the angle of the direction to the selectable area is calculated, and the smallest difference (in the example case illustrated in FIG. 12B, 17 degrees) among the calculated differences is acquired as the direction difference degree. In general, when a hand is moved as a part of a select operation, the user moves the hand toward any one of the selectable areas between the movement start time point (in this example, movement start time point T1) and the movement halt time point (in this example, movement halt time point T2). Conversely, in the case of a gesture motion, as illustrated in FIG. 3B (flick motion) and FIG. 19 (rolling motion), the movement direction is irrelevant to the direction toward the selectable area from the movement start time point. Hence, the direction difference degree representing whether or not the user's hand is moving toward any one of the selectable areas set on the operation screen is a coefficient representing the certainty on whether or not the hand movement is a part of a select operation. The smaller the direction difference degree is, the higher the certainty that the user's hand is moving to any one of the selectable areas becomes. That is, the smaller the direction difference degree is, the higher the certainty that the movement of the user's hand is a part of a select operation becomes. Conversely, the larger the direction difference degree is, the higher the certainty that the movement of the user's hand is not a select operation but is a gesture operation becomes.

Returning to the flow in FIG. 8, the shape comparator 154 of the controller 150 compares the shape of the user's hand at a time point at which the hand starts moving with the shape of the user's hand at a time point at which the hand quits moving. Next, the comparison result is acquired as a "shape difference degree" representing a change degree in shape (step S108). For example, the shape comparator 154 compares the positional relationship between the weight center position G1 of the hand area and a fingertip F1 at the movement start time point T1 with a positional relationship between the weight center position G2 of the hand area and a fingertip F2 to calculate the shape difference degree at the movement halt time point T2. More specifically, the shape comparator 154 calculates, as the shape difference degree, a difference between an angle of a line interconnecting the weight center position G1 of the hand area with the fingertip F1 at the movement start time point T1 and an angle of a line interconnecting the weight center position G2 of the hand area with the fingertip F2 at the movement halt time point T2 (for example, the smaller one between a clockwise angle and a counterclockwise angle). The shape difference degree calculated in this way is a barometer for a certainty that the user's hand is moving as a part of a predetermined gesture operation unlike a movement to any one of the selectable areas. This is because, in general, when the hand is moved as a part of a select operation, the user moves the hand without changing the shape thereof. Conversely, in the case of a gesture motion, as illustrated in FIG. 3B (flick motion) and FIG. 19 (rolling motion), the shape of the hand largely changes in comparison with that of a select operation. That is, the larger the shape difference degree is, the higher the certainty that the user's hand is moving as a part of a gesture operation becomes. As is demonstrated in FIG. 13A, when the motion of the user's hand is possibly a select operation, the shape difference degree becomes a small value (in the example case illustrated in FIG. 13A, difference between 345 degrees and 347 degrees=2 degrees). As is demonstrated in FIG. 13, when the motion of the user's hand is possibly a gesture operation different from a select operation, the shape difference degree becomes a larger value than that of a case in which the motion is possibly a select operation (in the example case illustrated in FIG. 13A, a difference between 328 degrees and 83 degrees=115 degrees).

Returning to the flow in FIG. 8, the input determiner 155 of the controller 150 adds the direction difference degree and the shape difference degree with a predetermined weight (step S109). When, for example, the direction difference degree acquired in the step S107 is D, and the shape difference degree acquired in the step S108 is S, with respective weight coefficients of the direction difference degree D and the shape difference degree S being set as $w1$, $w2$, an addition value ADD is acquired through the following (formula 1). The value of each weight is a setting value acquired through a test in advance and stored in the ROM. Alternatively, such a value may be settable by the user in accordance with the habit of the user's own operation. In this example, both $w1$ and $w2$ are positive values.

$$ADD = w1 \times D + w2 \times S \qquad \text{(Formula 1)}$$

The input determiner 155 determines whether or not the addition value (for example, the addition value ADD) is equal to or smaller than a predetermined threshold (step S110). When the addition value is equal to or smaller than the predetermined threshold (step S110: YES), it is determined that the motion of the user's hand is a select operation, and the process is advanced to step S111. When the addition value is larger than the predetermined threshold (step S110: NO), it is determined that the motion of the user's hand is a gesture operation, and the input determiner 155 advances the process to step S112. The addition value ADD is a coefficient representing whether the motion of the user's hand is for a gesture operation or is a part of a select operation, and is acquired based on the direction difference degree D representing toward which selectable area the user's hand is moving, and the shape difference degree S representing the magnitude of a change in shape of the user's hand. When both $w1$ and $w2$ are positive values, the larger the ADD is, the higher the possibility that the user's hand motion is a gesture motion becomes. Hence, by acquiring the ADD and determining that the motion of the user's hand is a gesture motion when the magnitude of the ADD exceeds a threshold, it becomes possible for the input device to determine the input in accordance with the user's intent.

When it is determined that the motion of the user's hand is a select operation (step S110: YES), the input determiner 155 determines which one of the selectable areas has been selected based on the direction in which the selectable area acquired in the step S106 is located relative to the user's hand, the weight center position G1 of the user's hand at the movement start time point T1, and the weight center position G2 of the user's hand at the movement halt time point T2. Next, the transmitter 156 notifies the application software of a command indicating that the selectable area is selected together with information determined by the input determiner 155 (step S111).

Returning to step S110, when it is determined that the motion of the user's hand is a gesture operation (step S110: NO), the input determiner 155 checks the motion trajectory drawn by the weight center of the hand from the start of movement to the halt thereof with the feature data in the gesture determination table illustrated in FIG. 6, thereby determining the gesture of the user. Next, the transmitter 156 acquires, from the command table, a control command allocated to the determined gesture (that is, identification information), and transmits the acquired control command to the application software (step S112). That is, the transmitter 156 transmits the determined input result to the application that has been subjected to an operation. When there is no corresponding feature data in the gesture determination table, the transmitter 156 does not input a control command, and directly terminates the step S112.

Upon completion of the inputting, the controller 150 returns the process to the step S101, and repeats the processes in the steps S101 to S111.

As explained above, since the motion of the user's hand is determined based on information regarding a change in shape of the user's hand, the input device 100 of this embodiment can precisely determine whether the motion of the user's hand is a select operation or is a gesture operation. For example, as illustrated in FIG. 13A and FIG. 13B, even if the user's hand is moving toward a selectable area in a similar manner, based on the information regarding a change in shape of the user's hand, for example, the case in FIG. 13A can be determined as a "select operation", while the case in FIG. 13B can be determined as a "gesture operation". Hence, the input device 100 can simultaneously recognize the gesture operation in addition to the select operation, as a result, the input device 100 can realize input operations with multiple variations, enhancing the input convenience for the user.

In addition, the user's motion is determined based on also information on the movement direction of the hand in addition to a change in shape of the user's hand. Hence, the input device 100 can further precisely determine whether the motion of the user's hand is a select operation or is a gesture operation. For example, as illustrated in FIG. 14, although the shape of the hand hardly changes throughout a movement, because the user's hand does not move toward a selectable area, the motion can be determined as not a "select operation" but as a "gesture operation".

Second Embodiment

The input device 100 of the first embodiment determines whether the input by the user is a select operation or is a gesture operation based on a change in shape of the hand at the movement start time point and at the movement halt time point. Alternatively, a configuration that includes determining the input by the user based on a step-by-step change in shape of the hand or a sequential change thereof along a time series of the hand shape from the start of movement to the halt of movement is also effective. This embodiment discloses an input device that determines an input by the user based on a step-by-step change or a sequential change in the shape of the hand along a time series.

An input device 100 of the second embodiment includes, as illustrated in FIG. 4, like the first embodiment, an operation device 110, a display 120, an imager 130, an image memory 140, a controller 150, and a memory 160.

According to the input device 100 of this embodiment, as illustrated in FIG. 15, the memory 160 ensures a memory area in an FIFO (First In First Out) (hereinafter, referred to as an "FIFO queue") format which can store image data by multiple frames (for example, three frames). The memory areas for the respective frames store a picked-up image of a hand currently (latest), a picked-up image n-2 previous by a time T, and a picked-up image n-3 previous by a time 2T, and the like. The controller 150 acquires image data of the latest single frame from the image memory 140 at a time interval T, and enqueues the acquired image data in the FIFO queue. As a result, for each time T, a new picked-up image is stored in the FIFO queue, and the picked-up image enqueued first (picked-up image n-4 in FIG. 15) among the currently stored images is dequeued. In the following explanation, picked-up images stored in the FIFO queue will be referred to as image data A, image data B, and image data C in a new order. The time interval T at which the controller 150 acquires an image from the image memory 140 is not limited to a specific time interval, and can be set freely. For example, it may be for each one second or for each one frame based on the setting at the time of factory shipment or a setting operation given by the user.

The other components of the input device 100 have the same functions as those of the first embodiment with the same names.

Next, an operation of the input device 100 of the second embodiment will be explained.

When receiving a process start instruction from the operation device 110, the controller 150 instructs the imager 130 to start picking up images. When instructed to start image-pickup, the imager 130 sequentially transmits the picked-up images to the image memory 140. In addition, after receiving the process start instruction from the operation device 110, the controller 150 runs application software and starts an "input process" to input various kinds of control information to the application software. The "input process" will be explained below with reference to the flowchart of FIG. 16.

The movement detector 152 determines whether or not the user's hand transitions from the halt condition to the moving condition through, for example, the same way as that in the step S103 of the first embodiment (step S201). When the user's hand does not transition to the moving condition (step S201: NO), the process in the step S201 is repeated until the user's hand transitions to the moving condition. When the user's hand transitions to the moving condition (step S201: YES), the process progresses to step S202.

The image acquire 151 determines whether or not the contents of the FIFO queue is updated by the controller 150, that is, whether or not the time T has elapsed since the last update of the FIFO queue (step S202). When the FIFO queue is not updated, or when the step S202 is first executed after the transition of the user's hand to the moving condition (step S202: NO), the process in the step S202 is repeated until the FIFO queue is updated. When the FIFO queue is updated (step S202: YES), the process progresses to step S203.

The direction comparator 153 specifies a change in movement direction of the user's hand for each time interval T. More specifically, the direction comparator 153 compares the movement direction of the user's hand (hereinafter, referred to as a "previous movement direction") from a previous time point that is time 2T before, to a previous time point that is time T before specified by the images A and B with the movement direction of the user's hand (hereinafter, referred to as a "current movement direction") from a previous time point that is time T before to a current time point specified by the images B and C. Next, the comparison result is acquired as a "direction difference degree" representing the difference degree in movement direction between the previous time point and the current time point (step S203). For example, as illustrated in FIG. 17A, the direction comparator 153 specifies, as the previous movement direction, an angle (in the example case illustrated in the figure, 88 degrees) of a line interconnecting a weight center position $G_A$ of the user's hand at the time point of the image A with a weight center position $G_B$ of the user's hand at the time point of the image B. In addition, the direction comparator specifies, as the current movement direction, an angle (in the example case illustrated in the figure, 96 degrees) of a line interconnecting the weight center position $G_B$ of the user's hand at the time point of the image B with a weight center position $G_C$ of the user's hand at the time point of the image C. Next, a difference between the two specified angles is acquired as a direction difference degree D. In the following explanation, in order to facilitate understanding to the present disclosure, as illustrated in FIG. 18, the direction difference degrees D are assigned with numbers, such as D0, D1, D2, and the like, in an acquired order after the detection of a movement (hereinafter, expressed as Di: i=0, 1, 2, 3, and the like). In general, when the hand is moved as a part of a select operation, the user moves the hand without changing the direction from the movement start time point to the movement halt time point. Hence, the smaller the direction difference degree D between each time period and the accumulated addition value thereof are, the higher the possibility that the movement of the hand is a part of a select operation becomes. Conversely, the larger the accumulated addition value is, the higher the possibility that the movement of the hand is a gesture operation different from the select operation becomes.

Returning to the flow in FIG. 16, the shape comparator 154 specifies a change in shape of the user's hand for each certain time period T. More specifically, the shape comparator 154 compares the shape of the user's hand (hereinafter, referred to as a "previous shape") at the time point of the image B with the shape of the user's hand (hereinafter, referred to as a "current shape") at the time point of the image C. Next, the comparison result is acquired as a "shape difference degree" representing a change degree in shape (step S204). For example, as illustrated in FIG. 17B, the shape comparator 154 calculates, as a shape difference degree S, a difference between an angle (in the example case illustrated in the figure, 351 degrees) of a line interconnecting the weight center position $G_B$ of the hand area with a fingertip $F_B$ at the time point of the image B and an angle (in the example case illustrated in the figure, 53 degrees) of a line interconnecting the weight center position $G_C$ of the hand area with a fingertip $F_C$ at the time point of the image C. In the following explanation, in order to facilitate understanding of the present disclosure, the shape difference degrees S are assigned with numbers, such as S0, S1, S2, and the like, in an acquired order after the detection of movement (hereinafter, expressed as Si: i=0, 1, 2, 3, and the like). In general, when the hand is moved as a part of a select operation, the user moves the hand without changing the shape thereof from the movement start time point (in this example case, the movement start time point T1) to the movement halt time point (in this example case, the movement halt time point T2). Hence, the smaller the shape difference degree S between each time period and the accumulated addition value thereof are, the higher the possibility that the movement of the hand is a part of a select operation becomes. Conversely, the larger the accumulated addition value of the shape difference degrees S is, the higher the possibility that the movement of the hand is a gesture operation different from the select operation becomes.

Returning to the flow in FIG. 16, the input determiner 155 adds the direction difference degree D1 and the shape difference degree S1 with a predetermined weight (step S205). For example, with respective weight coefficients of the direction difference degree D and the shape difference degree S being set as w1, w2, an addition value ADDi (i=0, 1, 2, 3, and the like) is acquired through the following (formula 2). The value of each weight is a setting value acquired through a test in advance and stored in the ROM. Alternatively, such a value may be settable by the user in accordance with the habit of the user's own operation. In this example, both w1 and w2 are positive values.

$$ADDi = w1 \times Di + w2 \times Si \quad \text{(Formula 2)}$$

The input determiner 155 accumulatively adds all addition values ADD acquired after the detection of the start of movement (step S206). For example, with the addition value calculated at the latest being as ADDn, the input determiner 155 acquires an accumulation value ACC through the following (formula 3).

$$ACC = ADD0 + ADD1 + \ldots + ADDn \quad \text{(Formula 3)}$$

The input determiner 155 determines whether or not the accumulation value ACC is equal to or greater than a predetermined threshold (step S207). When the accumulation value ACC is equal to or greater than the predetermined threshold (step S207: YES), the input determiner 155 determines that the input by the user is a gesture operation, and progresses the process to step S208. When the accumulation value is smaller than the predetermined threshold (step S207: NO), the process advances to step S210. This accumulation value ACC is a coefficient representing whether the motion of the user's hand is for a gesture operation or is a part of a select operation, and is acquired based on the change degree of the movement direction of the hand by the user and the change degree of the shape (angle) of the hand from the movement start time point T1 to the movement halt time point T2. When both w1 and w2 are positive values, the larger the ACC is, the higher the possibility that the motion of the hand is a gesture motion becomes. Hence, by acquiring the ACC and determining that the motion of the hand is a gesture motion when the magnitude of the ACC exceeds the threshold, it becomes possible for the input device to determine the input in accordance with the user's intent.

When the accumulation value ACC is equal to or greater than the predetermined threshold (step S207: YES), the movement detector 152 determines whether or not the user's hand transitions from the moving condition to the halt condition through, for example, the same way as that in the step S104 of the first embodiment (step S208). When the user's hand does not transition to the halt condition (step S208: NO), the process in the step S208 is repeated until the user's hand transitions to the halt condition. When the user's hand transitions to the halt condition (step S208: YES), the process progresses to step S209.

The input determiner 155 checks the motion trajectory drawn by the weight center of the hand from the start of movement and to the halt thereof with the feature data in the gesture determination table in FIG. 6, thereby determining the gesture of the user. Next, the transmitter 156 acquires a control command allocated to the determined gesture from the command table, and inputs the control command to the application software (step S209).

Returning to the step S207 in FIG. 16, when the accumulation value ACC is smaller than the predetermined threshold (step S207: NO), the movement detector 152 determines (step S210) whether or not the user's hand transitions from the moving condition to the halt condition through, for example, the same way as that in the step S104 of the first embodiment. When the user's hand does not transition to the halt condition (step S210: NO), the controller 150 returns the process to the step S202, and repeats the processes in the steps S202 to S210. When the user's hand transitions to the halt condition (step S210: YES), the process advances to the step S211.

The input determiner 155 determines which one of the selectable areas is selected through the same way as that in the step S111 of the first embodiment. Next, the transmitter 156 notifies the application software of information (control signals) indicating that the selectable area is selected (step S211).

As explained above, according to this embodiment, the input by the user is determined based on not only the shapes of the hand at the movement start time point and at the movement halt time point but also information on the shape of the hand while the hand is moving and on a change in direction thereof. In general, when the hand is moved as a part of a select operation, the user moves the hand substantially without changing the movement direction between the movement start time point and the movement halt time point. In addition, the hand is moved without changing the shape thereof. Conversely, in the case of a gesture motion, as illustrated in FIG. 3B (flick motion) and FIG. 19 (rolling motion), the movement direction and the shape of the hand are changed to move the hand. Although in the case of a gesture motion, for example, as illustrated in FIG. 19, the shape of the hand may remain the same at the movement start time point T1 and at the movement halt time point T2, and the movement direction may be directed toward the selectable area. The input device 100 of this embodiment can determine, although in such a case, whether or not the motion of the user's hand is a select operation or is a gesture operation appropriately. Therefore, the determination precision is high.

The respective embodiments described above are merely examples, and permit various changes and modifications can be made as needed.

For example, in the respective embodiments described above, the input device 100 determines the input by the user based on information on the movement direction of the hand and on a change in shape thereof, but the input by the user may be determined based on only information on a change in shape without information on the movement direction. In the case of, for example, the first embodiment, when the shape difference degree S acquired in the step S108 is equal to or smaller than the predetermined threshold, the input determiner 155 may determine that the motion of the user's hand is a select operation, and when the shape difference degree is larger than the predetermined threshold, the input determiner may determine that the motion of the user's hand is a gesture operation. In addition, in the case of, for example, the second embodiment, the input determiner 155 may determine the input by the user based on not the accumulated addition values ADD0 to ADDn, but an accumulation value of the shape difference degrees S0 to Sn. Still further, an average value of the shape difference degrees S0 to Sn may be applied instead of the accumulated addition value.

The "direction difference degree" representing the difference degree in movement direction is acquired in the step S107 or in the step S203. Instead of this configuration, the direction comparator 153 may acquire a "direction matching degree" representing the matching degree between the direction of the selectable area and the movement direction of the user's hand or the matching degree between the current movement direction and the previous movement direction.

At this time, the direction comparator 153 may calculate the direction matching degreeby adding a moving distance to the movement direction of the user's hand. For example, the direction comparator 153 creates a direction comparison map having areas set step by step with reference to the direction of the selectable area acquired in the step S106 and the position of the user's hand at the movement start time point (for example, as illustrated in FIG. 20A, rectangular areas A to E having diagonal lines on lines interconnecting the weight center position G1 of the user's hand at the movement start time point T1 with the centers of the respective selectable areas are set step by step). Next, the direction comparator 153 allocates a value to each area in such a way that the more the area lies distant from the weight center position of the user's hand, the larger the value becomes. The direction comparator 153 acquires, as the direction matching degree, a value allocated to an area where the weight center G2 of the user's hand is located at the movement halt time point T2 (in the example case illustrated in FIG. 20B, the area C). That is, the value of a weight is set in such a way that the closer a position where the directions match with each other is to the selectable area, the more it is determined that the motion of the user's hand is determined as a select operation. Such a configuration enables a highly precise input determination.

In addition, in the step S108 or in the step S204, the "shape difference degree" representing a change degree in shape of the hand is acquired. However, the shape comparator 154 may acquire a "shape matching degree" representing the matching degree between the shape of the hand at the movement start time point T1 and the shape of the hand at the movement halt time point T2, or the matching degree between the previous shape of the hand and the current shape of the hand. In this case, the value of a weight is set in such a way that the higher the shape matching degree is, the more it is determined that the motion of the hand is a part of a select operation.

In the step S109 or in the step S205, the direction difference degree (direction difference degree D or Di) and the shape difference degree (shape difference degree S or Si) are added with a predetermined weight to acquire an addition value, and it is determined whether or not the motion of the user's hand is a select operation or is a gesture operation based on the addition value. Instead of this configuration, the input determiner 155 may determine whether or not the motion of the user's hand is a select operation or is a gesture motion based on a value obtained by adding the direction matching degree and the shape matching degree with a predetermined weight.

In order to assist a gesture operation, it is effective that the input device 100 display, on the operation screen, a guide indicating an ideal action of the hand for a gesture operation. For example, as is indicated by RA and RB in FIG. 21A, band-shape semi-transparent guide indicators that guide an ideal motion of the hand for the user are output. At this time, the controller 150 may include a feed-backer having a function of outputting a motion trajectory drawn by user's hand in a visible manner along the guide indicator. For example, the feed-backer displays a star light track moving along the band in accordance with the position of the user's hand as illustrated in FIG. 21A when the user's hand moves along the band of the guide indicator near such a band. In addition, as a further input assist, the feed-backer may change the way of displaying the guide in accordance with likelihood that the motion of the hand is a gesture operation. In this case, for example, the transparency of the guide indicator is changed as needed based on a change in accumulation value ACC calculated in the step S206. More specifically, as is indicated by RC in FIG. 21B, the larger the value of the accumulation value ACC is, the more the feed-backer decreases the transparency of the guide indicator. This configuration allows the user to recognize that the motion of the user's hand has been determined to be a gesture operation.

According to the embodiments described above, in the step S109 or in the step S205, a change in shape of the hand (shape difference degree) is acquired based on a change in angle of a line interconnecting the weight center position of the hand with a fingertip. Instead of this configuration, the shape comparator 154 may detect a change in shape of the hand based on a distance between the weight center position of the hand and the fingertip. As illustrated in FIG. 22, The shape comparator 154 may calculate, as the shape difference degree, a difference between a distance L1 from the weight center position of the hand and the fingertip at the movement start time point T1 or the previous time point and a distance L2 from the weight center position of the hand and the fingertip at the movement halt time point T2 or the current time point. In the calculation of the shape difference degree, information on a change in angle of a line interconnecting the weight center position of the hand with the fingertip may be further applied. According to this configuration, a change in shape of the hand can be precisely detected.

The shape comparator 154 may correct the shape difference degree or the shape matching degree calculated based on the moving distance of the hand. For example, the shape comparator 154 calculates, as the moving distance of the hand, a distance between the weight center position of the hand at the previous time point and the weight center position thereof at the current time point, and corrects the calculated shape difference degree or the shape matching degree in such a way that the larger the calculated moving distance is, the smaller the shape difference degree becomes or the larger the moving distance is, the larger the shape matching degree becomes. For example, the shape difference degree may be divided by the moving distance to acquire a new shape difference degree. Alternatively, the shape matching degree may be multiplied by the moving distance to acquire a new shape matching degree. For example, as illustrated in FIG. 23A, when the moving distance is long (that is, when the moving speed of the hand is fast), it can be determined that a change in shape of the hand is little although there is a slight angle change. Conversely, as illustrated in FIG. 23B, when the moving distance is short (that is, the moving speed of the hand is slow), it can be determined that a change in shape of the hand is large even if an angle change is small. According to this configuration, the input determination system can be improved through a determination process on the basis of comprehensive evaluation on the moving speed and on the change in shape of the hand.

In the respective embodiments described above, the transmitter 156 transmits the determined control command to the application software. However, the software to which the control command is transmitted based on the input determination result is not limited to application software. The input determiner 155 may input the determined control command to, for example, an operating system. In addition, the determined command may be input to other devices than the input device 100 through a communication line or a wireless communication. That is, separately from the input device, there may be a device that executes an application or an operating system subjected to an operation. In this case, instead of transmitting a determined input to the application of the same device, an output device that transmits an input result to the other device executing the application through, as the transmitter, a parallel port or a USB (Universal Serial Bus) terminal may be provided.

In the embodiments described above, a personal computer was explained as an example input device 100, but the input device 100 is not limited to a personal computer, and may be other kinds of electric devices having a function of determining an input by the user. For example, the input device 100 may be a television, a recorder, a game apparatus, a fixed-line telephone, a mobile phone, a smartphone, a tablet terminal, or a PDA (Personal Digital Assistant).

The input device 100 of the aforementioned embodiments may be realized by a dedicated system, or may be realized by a normal computer system. For example, a computer-readable non-transitory recording medium having stored therein a program for executing the above-explained operations may be distributed, and such a program may be installed in a computer to configure the input device 100 that executes the above-explained processes. In addition, such a program may be stored in a disk device of a server device or the like over a network like the Internet, and may be downloaded or the like to a computer. The above-explained functions may be realized by a cooperative work of an OS and an application software. In this case, only the portion other than the OS may be stored in a medium and distributed or downloaded or the like to a computer.

Example applicable non-transitory recording medium storing the program is a USB memory, a flexible disk, a CD (Compact Disc), a DVD (Digital Versatile Disc), a Blu-ray Disc (registered trademark), an MO (Magneto-Optical disk), an SD memory card (Secure Digital memory card), a memory stick (registered trademark), or other computer-readable non-transitory recording medium, such as a magnetic disk, an optical disk, a magneto-optical disk, a semiconductor memory, or a magnetic tape. In addition, the computer program may be superimposed on carrier waves, and distributed through a communication network. For example, the computer program may be posted on a BBS (Bulletin Board System) over the communication network, and such a computer program may be distributed through the network. Next, by running the computer program, the respective functions of the input device 1 may be realized.

Modifications and variations can be made without departing from broader spirit and scope of the present disclosure. It should be noted that the above embodiments are meant only to be illustrative of those embodiments and are not intended to be limiting the scope of the present disclosure. Accordingly, the scope of the present disclosure should not be determined by the embodiments illustrated, but by the appended claims. It is therefore the intention that the present disclosure be interpreted to include various modifications that are made within the scope of the claims and their equivalents.

The aforementioned embodiments in part or in whole can be described as the following supplementary notes, but the present disclosure is not limited to the following supplementary notes.

(Supplementary Note 1)

An input device that determines an input by a user based on a motion of a hand of the user in picked-up images associated with an operation screen having one or more defined selectable areas, the input device comprising:

an input determining means that determines whether or not the input by the user is a select operation of a selectable area or is a gesture operation different from the select operation based on a change in shape of the hand in a plurality of the picked-up images, the change in shape of the hand being caused by the moving hand.

(Supplementary Note 2)

The input device according to Note 1, wherein the input determining means determines whether or not the input by the user is the select operation of the selectable area or is the gesture operation based on a change in shape of the hand caused by the moving hand and further a direction in which the hand moves in the plurality of the picked-up images.

(Supplementary Note 3)

The input device according to Note 2, further comprising a movement detecting means that detects a movement start time point of the hand and a movement halt time point thereof, wherein the input determining means determines whether or not the input by the user is the select operation of the selectable area or is the gesture operation based on a change in shape of the hand specified by comparing a shape of the hand at the movement start time point with a shape of the hand at the movement halt time point, and movement direction of the hand specified based on a position of the hand at the movement start time point and a position of the hand at the movement halt time point.

(Supplementary Note 4)

The input device according to Note 2, further comprising a movement detecting means that detects a movement start time point of the hand and a movement halt time point thereof, wherein the input determining means determines whether or not the input by the user is the select operation of the selectable area or is the gesture operation based on a change in shape of the hand for each predetermined time interval from the movement start time point to the movement halt time point, and further a change in movement direction of the hand for the each predetermined time interval from the movement start time point to the movement halt time point.

(Supplementary Note 5)

The input device according to Note 3, further comprising:

a shape comparing means that compares the shape of the hand at the movement start time point with the shape of the hand at the movement halt time point, and calculates a shape difference degree representing a difference degree in shape or a shape matching degree representing a matching degree in shape; and a direction comparing means that specifies the movement direction of the hand based on the position of the hand at the movement start time point and the position of the hand at the movement halt time point, specifies a direction of the selectable area with reference to the position of the hand at the movement start time point, compares the specified movement direction of the hand with the specified direction of the selectable area, and calculates a direction difference degree representing a difference degree in direction or a direction matching degree representing a matching degree in direction, wherein the input determining means adds the shape difference degree or the shape matching degree and the direction difference degree or the direction matching degree with a predetermined weight, and determines whether or not the input by the user is the select operation of the selectable area or is the gesture operation based on the addition value.

(Supplementary Note 6)

The input device according to Note 4, further comprising:

a shape comparing means that compares, for the each predetermined time interval, the shape of the hand at a current time point with the shape of the hand prior to the determined time period and calculates a shape difference degree representing a difference degree in shape or a shape matching degree representing a matching degree in shape; and a direction comparing means that compares, for the each predetermined time interval, the movement direction at the current time point with the movement direction at a previous time point, and calculates a direction difference degree representing a difference degree in direction or a direction matching degree representing a matching degree in direction, wherein the input determining means:

adds the shape difference degree or the shape matching degree and the direction difference degree or the direction matching degree with a predetermined weight;

accumulatively adds the addition values for the each predetermined time interval with the movement start time point being as an accumulation start time point; and determines that the input by the user is the gesture operation when the accumulated addition value exceeds a predetermined threshold, and determines that the input by the user is the select operation of the selectable area when the accumulated addition value does not exceed the predetermined threshold until the movement halt time point or within a predetermined time period after the start of accumulation.

(Supplementary Note 7)

The input device according to Note 6, wherein:

the hand is a hand of the user with a finger pointing; and the shape comparing means compares a positional relationship between a weight center position of the hand and a fingertip at the current time point with a positional relationship between a weight center position of the hand and a fingertip prior to the predetermined time period, and calculates the shape difference degree or the shape matching degree.

(Supplementary Note 8)

The input device according to Note 6 or 7, wherein:

the operation screen displays a band-shape semi-transparent guide indicator that guides to the user an ideal motion trajectory of the hand; and the input device further comprises a feed-backing means that outputs a motion trajectory drawn by the hand in a visibly recognizable manner along the guide indicator, and sequentially changes a transparency of the guide indicator in accordance with the accumulated addition value.

(Supplementary Note 9)

An input method for determining an input by a user based on a motion of a hand of the user in picked-up images associated with an operation screen displaying one or more selectable areas subjected to a select operation, the method comprising:

determining whether the input by the user is the select operation of a selectable area or is a gesture operation different from the select operation based on a change in shape of the hand in a plurality of the picked-up images, the change in shape of the hand being caused by the moving hand.

(Supplementary Note 10)

A computer-readable non-transitory recording medium having stored therein a program, the program causing a computer that controls an input device determining an input by a user based on a motion of a hand of the user in picked-up images associated with an operation screen displaying one or more selectable areas to execute:

an input determination function of determining whether the input by the user is a select operation of a selectable area or is a gesture operation different from the select operation based on a change in shape of the hand in a plurality of the picked-up images, the change in shape of the hand being caused by the moving hand.

The present application is based on Japanese Patent Application No. 2012-181223 filed on Aug. 17, 2012. The whole specification, claims, and drawings of Japanese Patent Application No. 2012-181223 are herein incorporated in this specification by reference.

INDUSTRIAL APPLICABILITY

The present disclosure is applicable to an input device that determines an input by a user based on a picked-up image of the hand of the user.

REFERENCE SIGNS LIST

100 Input device
110 Operation device
120 Display
130 Imager
140 Image memory
150 Controller
151 Image acquirer
152 Movement detector
153 Direction comparator
154 Shape comparator
155 Input determiner
156 Transmitter
160 Memory

The invention claimed is:

1. An input device that determines an input by a user based on a motion of a hand of the user in picked-up images associated with an operation screen having one or more defined selectable areas, the input device comprising:
a movement detector that detects a movement start time point of the hand and a movement halt time point thereof;
a shape comparator that compares the shape of the hand at the movement start time point with the shape of the hand at the movement halt time point, and calculates a shape difference degree representing a difference degree in shape or a shape matching degree representing a matching degree in shape;
a direction comparator that specifies the movement direction of the hand based on the position of the hand at the movement start time point and the position of the hand at the movement halt time point, specifies a direction of the selectable area with reference to the position of the hand at the movement start time point, compares the specified movement direction of the hand with the specified direction of the selectable area, and calculates a direction difference degree representing a difference degree in direction or a direction matching degree representing a matching degree in direction; and
an input determiner that adds the shape difference degree or the shape matching degree and the direction difference degree or the direction matching degree with a predetermined weight, and determines whether or not the input by the user is a select operation of a selectable area or is a gesture operation different from the select operation based on the addition value.

2. An input device that determines an input by a user based on a motion of a hand of the user in picked-up images associated with an operation screen having one or more defined selectable areas, the input device comprising:
a movement detector that detects a movement start time point of the hand and a movement halt time point thereof;
a shape comparator that compares, for each time interval in a set of predetermined time intervals, the shape of the hand at a current time point with the shape of the hand at a previous time point and calculates a shape difference degree representing a difference degree in shape or a shape matching degree representing a matching degree in shape;
a direction comparator that compares, for each time interval in the set of predetermined time intervals, the movement direction at the current time point with the movement direction at the previous time point, and calculates a direction difference degree representing a difference degree in direction or a direction matching degree representing a matching degree in direction; and
an input determiner that:
for each time interval in the set of predetermined time intervals, adds the shape difference degree or the shape matching degree and the direction difference degree or the direction matching degree with a predetermined weight;
accumulatively adds the addition values for each time interval in the set of predetermined time intervals with the movement start time point being an accumulation start time point; and
determines that the input by the user is the gesture operation when the accumulated addition value exceeds a predetermined threshold, and determines that the input by the user is the select operation of the selectable area when the accumulated addition value does not exceed the predetermined threshold at the movement halt time point or within a predetermined time period after the accumulation start time point.

3. The input device according to claim 2, wherein:
the hand is a hand of the user with a finger pointing; and
the shape comparator compares a positional relationship between a weight center position of the hand and a fingertip at the current time point with a positional relationship between a weight center position of the hand and a fingertip prior to the predetermined time period, and calculates the shape difference degree or the shape matching degree.

4. The input device according to claim 2, wherein:
the operation screen displays a band-shape semi-transparent guide indicator that guides to the user an ideal motion trajectory of the hand; and
the input device further comprises a feed-backer that outputs a motion trajectory drawn by the hand in a visibly recognizable manner along the guide indicator, and sequentially changes a transparency of the guide indicator in accordance with the accumulated addition value.

5. A computer-readable non-transitory recording medium having stored therein a program, the program causing a computer that controls an input device determining an input by a user based on a motion of a hand of the user in picked-up images associated with an operation screen displaying one or more selectable areas to execute:
a movement detection function of detecting a movement start time point of the hand and a movement halt time point thereof;
a shape comparison function of comparing the shape of the hand at the movement start time point with the shape of the hand at the movement halt time point, and calculating a shape difference degree representing a difference degree in shape or a shape matching degree representing a matching degree in shape;
a direction comparison function of specifying the movement direction of the hand based on the position of the hand at the movement start time point and the position of the hand at the movement halt time point, specifying a direction of the selectable area with reference to the position of the hand at the movement start time point, comparing the specified movement direction of the hand with the specified direction of the selectable area, and calculating a direction difference degree representing a difference degree in direction or a direction matching degree representing a matching degree in direction; and an input determination function of adding the shape difference degree or the shape matching degree and the direction difference degree or the direction matching degree with a predetermined weight, and determining whether or not the input by the user is a select operation of a selectable area or is a gesture operation different from the select operation based on the addition value.

6. A computer-readable non-transitory recording medium having stored therein a program, the program causing a computer that controls an input device determining an input by a user based on a motion of a hand of the user in picked-up images associated with an operation screen displaying one or more selectable areas to execute:

a movement detection function of detecting a movement start time point of the hand and a movement halt time point thereof;

a shape comparison function of comparing, for each time interval in a set of predetermined time intervals, the shape of the hand at a current time point with the shape of the hand at a previous time point and calculating a shape difference degree representing a difference degree in shape or a shape matching degree representing a matching degree in shape;

a direction comparison function of comparing, for each time interval in the set of predetermined time intervals, the movement direction at the current time point with the movement direction at the previous time point, and calculating a direction difference degree representing a difference degree in direction or a direction matching degree representing a matching degree in direction; and an input determination function of:

for each time interval in the set of predetermined time intervals, adding the shape difference degree or the shape matching degree and the direction difference degree or the direction matching degree with a predetermined weight;

accumulatively adding the addition values for each time interval in the set of predetermined time intervals with the movement start time point being an accumulation start time point; and determining that the input by the user is the gesture operation when the accumulated addition value exceeds a predetermined threshold, and determining that the input by the user is the select operation of the selectable area when the accumulated addition value does not exceed the predetermined threshold at the movement halt time point or within a predetermined time period after the accumulation start time point.

* * * * *